United States Patent
Yi et al.

(10) Patent No.: US 10,187,927 B2
(45) Date of Patent: *Jan. 22, 2019

(54) DATA COMMUNICATION METHOD AND TERMINAL

(71) Applicant: Huawei Technologies Co., Ltd., Shenzhen (CN)

(72) Inventors: Qiang Yi, Beijing (CN); Hui Jin, Beijing (CN); Guowei Ouyang, Beijing (CN); Yue He, Beijing (CN); Longyu Cao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,290

(22) Filed: Apr. 4, 2018

(65) Prior Publication Data

US 2018/0227984 A1 Aug. 9, 2018

Related U.S. Application Data

(63) Continuation of application No. 15/654,284, filed on Jul. 19, 2017, now Pat. No. 9,967,918, which is a
(Continued)

(51) Int. Cl.
*H04W 24/00* (2009.01)
*H04B 7/00* (2006.01)
(Continued)

(52) U.S. Cl.
CPC ......... *H04W 88/04* (2013.01); *H04L 61/2069* (2013.01); *H04W 4/06* (2013.01);
(Continued)

(58) Field of Classification Search
CPC ...... H04W 88/04; H04W 4/06; H04L 61/2069
See application file for complete search history.

(56) References Cited

U.S. PATENT DOCUMENTS

| 7,953,045 B2 * | 5/2011 | Han | H04L 29/12311 370/332 |
| 2004/0114559 A1 * | 6/2004 | Wang | H04L 29/12216 370/338 |

(Continued)

FOREIGN PATENT DOCUMENTS

| CN | 104283979 A | 1/2015 |
| WO | 2014077580 A1 | 5/2014 |

OTHER PUBLICATIONS

"3rd Generation Partnership Project; Technical Specification Group Services and System Aspects; Study on extended architecture support for Proximity-based services (Release 13)," 3GPP TR 23.713, V0.3.0, Nov. 2014, 40 pages.
(Continued)

*Primary Examiner* — Dominic E Rego
(74) *Attorney, Agent, or Firm* — Conley Rose, P.C.

(57) ABSTRACT

A data communication method, where a first device receives a request message from at least one second device, where the request message requests the first device to forward group data, and the request message carries a group identifier. The first device returns a response message to the at least one second device, where the response message carries a layer-2 address and an Internet Protocol (IP) address corresponding to the group identifier, and the first device sends the group data using the layer-2 address when receiving the group data sent by a third device to the IP address.

11 Claims, 10 Drawing Sheets

Related U.S. Application Data continuation of application No. PCT/CN2015/071034, filed on Jan. 19, 2015.

(51) Int. Cl.
*H04W 88/04* (2009.01)
*H04W 4/06* (2009.01)
*H04L 29/12* (2006.01)
*H04W 76/40* (2018.01)

(52) U.S. Cl.
CPC ...... *H04L 61/2507* (2013.01); *H04L 61/2585* (2013.01); *H04L 61/6022* (2013.01); *H04L 61/6063* (2013.01); *H04W 76/40* (2018.02)

(56) References Cited

U.S. PATENT DOCUMENTS

| | | |
|---|---|---|
| 2004/0249977 A1 | 12/2004 | Minamisawa |
| 2006/0007930 A1 | 1/2006 | Dorenbosch |
| 2007/0171865 A1 | 7/2007 | Kato |
| 2008/0232368 A1 | 9/2008 | Ikegami et al. |
| 2009/0327434 A1 | 12/2009 | Reynolds |
| 2010/0080235 A1* | 4/2010 | Yamate .................. H04L 45/00 370/395.31 |
| 2011/0238854 A1 | 9/2011 | Fang et al. |
| 2012/0033678 A1 | 2/2012 | Page et al. |
| 2012/0089714 A1 | 4/2012 | Carley |
| 2012/0113817 A1 | 5/2012 | Fitzgerald et al. |
| 2013/0007231 A1 | 1/2013 | Forssell |
| 2013/0039215 A1 | 2/2013 | Aboul-Magd et al. |
| 2013/0167211 A1 | 6/2013 | Kamat |
| 2014/0351445 A1 | 11/2014 | Davidson et al. |
| 2016/0127306 A1 | 5/2016 | Wang et al. |

OTHER PUBLICATIONS

"3rd Generation Partnership Project; Technical Specification Group Services and System Aspects; Proximity-based services (ProSe); Stage 2 (Release 12)," 3GPP TS 23.303, V12.3.0, Dec. 2014, 62 pages.

"3rd Generation Partnership Project; Technical Specification Group Services and System Aspects; Group Communication System Enablers for LTE (GCSE_LTE); Stage 2 (Release 12)," 3GPP TS 23.468, V12.3.0, Dec. 2014, 26 pages.

Xiran Ma, "D2D and Small Cell Oriented Relay Technologies," Part 1, Mar. 10, 2013, 41 pages.

Xiran Ma, "D2D and Small Cell Oriented Relay Technologies," Part 2, Mar. 10, 2013, 35 pages.

Foreign Communication From a Counterpart Application, PCT Application No. PCT/CN2015/071034, English Translation of International Search Report dated Oct. 22, 2015, 2 pages.

Foreign Communication From a Counterpart Application, PCT Application No. PCT/CN2015/071034, English Translation of Written Opinion dated Oct. 22, 2015, 6 pages.

* cited by examiner

DATA COMMUNICATION METHOD AND TERMINAL

CROSS-REFERENCE TO RELATED APPLICATIONS

This application is a continuation of U.S. patent application Ser. No. 15/654,284 filed on Jul. 19, 2017, which is a continuation of International Patent Application No. PCT/CN2015/071034 filed on Jan. 19, 2015. All of the aforementioned patent applications are hereby incorporated by reference in their entireties.

TECHNICAL FIELD

The present disclosure relates to the field of communications technologies, and in particular, to a data communication method and a terminal.

BACKGROUND

In a conventional mobile network, when user equipment (UE) is out of network coverage (for example, an emergency such as an earthquake occurs), UE that is in network coverage may be used as a relay such that the UE that is out of network coverage can communicate with a network side.

For ease of understanding, referring to FIG. 1A, FIG. 1A is a schematic diagram of a network architecture. In the schematic diagram, remote UE is UE that is out of network coverage (for ease of description, the UE that is out of network coverage is referred to as a remote terminal), and relay UE is UE that is in network coverage (for ease of description, the UE that is in network coverage is referred to as a relay terminal). The relay terminal may simultaneously serve as a relay for multiple remote terminals. In an existing method, when multiple remote terminals need to request to obtain a same piece of group data from a server, each remote terminal needs to establish a unicast communication connection to the server, where the unicast communication connection is used to request and receive the group data. The server sends the requested group data to each remote terminal based on the unicast communication connection. When information is being exchanged between the server and the remote terminal, because the information needs to be forwarded using a relay terminal, the same group data is repeatedly transmitted over a Uu interface, thereby undoubtedly reducing data transmission efficiency.

SUMMARY

The present disclosure provides a data communication method and a device, to improve data transmission efficiency.

According to a first aspect, an embodiment of the present disclosure provides a data communication method, including receiving, by a first device, a request message sent by at least one second device, where the request message is used to request the first device to forward group data, and the request message carries a group identifier, returning, by the first device, a response message to the at least one second device, where the response message carries a layer-2 address and an Internet Protocol (IP) address that are corresponding to the group identifier, and sending, by the first device, the group data using the layer-2 address when receiving the group data that is sent by a third device to the IP address.

With reference to the first aspect, in a first possible implementation manner of the first aspect, the IP address is an IP address that is allocated by the first device and that is used by the at least one second device to request the group data from the third device.

With reference to the first aspect, in a second possible implementation manner of the first aspect, the response message further carries a port number corresponding to the group identifier, and the port number is a port number that is allocated by the first device and that is used by the at least one second device to request the group data from the third device.

With reference to the first aspect, in a third possible implementation manner of the first aspect, after receiving, by a first device, a request message sent by at least one second device, the method further includes determining, by the first device, whether a context corresponding to the group identifier exists, and allocating, by the first device, the layer-2 address and the IP address that are corresponding to the group identifier if the context does not exist, and returning, by the first device, a response message to the at least one second device, where the response message carries a layer-2 address and an IP address that are corresponding to the group identifier includes returning, by the first device, the response message to the at least one second device, where the response message carries the allocated layer-2 address and the allocated IP address.

With reference to the third possible implementation manner of the first aspect, in a fourth possible implementation manner of the first aspect, the method further includes obtaining, by the first device, the layer-2 address and the IP address that are corresponding to the group identifier if the context exists, and returning, by the first device, a response message to the at least one second device, where the response message carries a layer-2 address and an IP address that are corresponding to the group identifier includes returning, by the first device, the response message to the at least one second device, where the response message carries the obtained layer-2 address and the obtained IP address.

With reference to the third possible implementation manner of the first aspect, in a fifth possible implementation manner of the first aspect, the method further includes if the context does not exist, the response message further carries a unicast indication identifier such that the at least one second device requests the group data from the third device using the IP address.

With reference to the first aspect or any one of the foregoing possible implementation manners of the first aspect, in a sixth possible implementation manner of the first aspect, after returning, by the first device, a response message to the at least one second device, the method further includes receiving, by the first device, a first message sent by a target second device, where the target second device is a second device that is in the at least one second device and that fails to detect the group identifier or information corresponding to the group identifier by means of listening, and the first message is a message sent after the target second device successfully requests the group data from the third device, and returning, by the first device, a second message to the target second device such that the target second device keeps a communication connection to the third device if the first device receives the first message for the first time, where the communication connection is used to receive the group data.

With reference to the sixth possible implementation manner of the first aspect, in a seventh possible implementation manner of the first aspect, the method further includes returning, by the first device, a third message to the target second device such that the target second device releases the communication connection to the third device if the first device does not receive the first message for the first time, where the communication connection is used to receive the group data.

With reference to the sixth possible implementation manner of the first aspect, in an eighth possible implementation manner of the first aspect, after returning, by the first device, a second message to the target second device, the method further includes broadcasting, by the first device, the group identifier or the information corresponding to the group identifier.

According to a second aspect, an embodiment of the present disclosure provides a data communication method, including sending, by a second device, a request message to a first device, where the request message is used to request the first device to forward group data, and the request message carries a group identifier, receiving, by the second device, a response message returned by the first device, where the response message carries a layer-2 address and an IP address that are corresponding to the group identifier, and the first device receives a request message sent by at least one second device, and when receiving the group data that is sent by a third device to the IP address, sends the group data using the layer-2 address, and receiving, by the second device, the group data at the layer-2 address.

With reference to the second aspect, in a first possible implementation manner of the second aspect, the response message further carries a port number corresponding to the group identifier, and the IP address and the port number are an IP address and a port number that are allocated by the first device and that are used by the second device to request the group data.

With reference to the second aspect or the first possible implementation manner of the second aspect, in a second possible implementation manner of the second aspect, after receiving, by the second device, a response message returned by the first device, the method further includes requesting, by the second device, the group data from the third device using the IP address, or requesting, by the second device, the group data from the third device using the IP address and the port number.

With reference to the second possible implementation manner of the second aspect, in a third possible implementation manner of the second aspect, requesting, by the second device, the group data from the third device includes requesting, by the second device, the group data from the third device if the second device fails to detect the group identifier or information corresponding to the group identifier by means of listening, or requesting, by the second device, the group data from the third device if the response message further carries a unicast indication identifier.

With reference to the second or the third possible implementation manner of the second aspect, in a fourth possible implementation manner of the second aspect, after the second device successfully requests the group data from the third device, the method further includes sending, by the second device, a first message to the first device, keeping, by the second device, a communication connection to the third device if a second message returned by the first device is received, where the communication connection is used to receive the group data, and releasing, by the second device, the communication connection to the third device if a third message returned by the first device is received, where the communication connection is used to receive the group data.

With reference to the second or the third possible implementation manner of the second aspect, in a fifth possible implementation manner of the second aspect, requesting, by the second device, the group data from the third device includes setting the IP address and/or the port number as a source IP address and/or a source port number of a data packet that is used to transmit application signaling, and sending the data packet to the third device, to request the group data from the third device, or setting the IP address and/or the port number as an IP address and/or a port number in a Session Description Protocol (SDP) message body in a Session Initiation Protocol (SIP) message, and sending the SIP message to the third device to request the group data from the third device.

According to a third aspect, an embodiment of the present disclosure provides a device, including a first receiving module configured to receive a request message sent by at least one second device, where the request message is used to request the device to forward group data, and the request message carries a group identifier, a first returning module configured to return a response message to the at least one second device, where the response message carries a layer-2 address and an IP address that are corresponding to the group identifier, and a first sending module configured to send the group data using the layer-2 address when the group data that is sent by a third device to the IP address is received.

With reference to the third aspect, in a first possible implementation manner of the third aspect, the IP address is an IP address that is allocated by the device and that is used by the at least one second device to request the group data from the third device.

With reference to the third aspect, in a second possible implementation manner of the third aspect, the response message further carries a port number corresponding to the group identifier, and the port number is a port number that is allocated by the first device and that is used by the at least one second device to request the group data from the third device.

With reference to the third aspect, in a third possible implementation manner of the third aspect, the device further includes a determining module configured to determine whether a context corresponding to the group identifier exists after the first receiving module receives the request message sent by the at least one second device, and an allocation module configured to allocate the layer-2 address and the IP address that are corresponding to the group identifier if the context does not exist, where the response message returned by the first returning module carries the layer-2 address and the IP address that are allocated by the allocation module.

With reference to the third possible implementation manner of the third aspect, in a fourth possible implementation manner of the third aspect, the device further includes an obtaining module configured to obtain the layer-2 address and the IP address that are corresponding to the group identifier if the context exists, where the response message returned by the first returning module carries the layer-2 address and the IP address that are obtained by the obtaining module.

With reference to the third possible implementation manner of the third aspect, in a fifth possible implementation manner of the third aspect, if the context does not exist, the response message returned by the first returning module further carries a unicast indication identifier such that the at least one second device requests the group data from the third device using the IP address.

With reference to the third aspect or any one of the foregoing possible implementation manners of the third aspect, in a sixth possible implementation manner of the third aspect, the first receiving module is further configured to receive a first message sent by a target second device after the first returning module returns the response message to the at least one second device, where the target second device is a second device that is in the at least one second device and that fails to detect the group identifier or information corresponding to the group identifier by means of listening, and the first message is a message sent after the target second device successfully requests the group data from the third device, and the first returning module is further configured to return a second message to the target second device such that the target second device keeps a communication connection to the third device if the first device receives the first message for the first time, where the communication connection is used to receive the group data.

With reference to the sixth possible implementation manner of the third aspect, in a seventh possible implementation manner of the third aspect, the first returning module is further configured to return a third message to the target second device such that the target second device releases the communication connection to the third device if the first device does not receive the first message for the first time, where the communication connection is used to receive the group data.

With reference to the sixth possible implementation manner of the third aspect, in an eighth possible implementation manner of the third aspect, the device further includes a broadcasting module configured to broadcast the group identifier or the information corresponding to the group identifier after the first returning module returns the second message to the target second device.

According to a fourth aspect, an embodiment of the present disclosure provides a device, including a second sending module configured to send a request message to a first device, where the request message is used to request the first device to forward group data, and the request message carries a group identifier, a second receiving module configured to receive a response message returned by the first device, where the response message carries a layer-2 address and an IP address that are corresponding to the group identifier, and the first device receives a request message sent by at least one device, and when receiving the group data that is sent by a third device to the IP address, sends the group data using the layer-2 address, and a third receiving module configured to receive the group data at the layer-2 address.

With reference to the fourth aspect, in a first possible implementation manner of the fourth aspect, the response message further carries a port number corresponding to the group identifier, and the IP address and the port number are an IP address and a port number that are allocated by the first device and that are used by the device to request the group data.

With reference to the fourth aspect or the first possible implementation manner of the fourth aspect, in a second possible implementation manner of the fourth aspect, the device further includes a request module configured to request the group data from the third device using the IP address, or request the group data from the third device using the IP address and the port number after the second receiving module receives the response message returned by the first device.

With reference to the second possible implementation manner of the fourth aspect, in a third possible implementation manner of the fourth aspect, if the device fails to detect the group identifier or information corresponding to the group identifier by means of listening, the request module requests the group data from the third device, or if the response message further carries a unicast indication identifier, the request module requests the group data from the third device.

With reference to the second or the third possible implementation manner of the fourth aspect, in a fourth possible implementation manner of the fourth aspect, the second sending module is further configured to send a first message to the first device after the request module successfully requests the group data from the third device, and the device further includes a keeping module configured to keep a communication connection to the third device if a second message returned by the first device is received, where the communication connection is used to receive the group data, and a releasing module configured to release the communication connection to the third device if a third message returned by the first device is received, where the communication connection is used to receive the group data.

With reference to the second or the third possible implementation manner of the fourth aspect, in a fifth possible implementation manner of the fourth aspect, the request module is further configured to set the IP address and/or the port number as a source IP address and/or a source port number of a data packet that is used to transmit application signaling, and send the data packet to the third device, to request the group data from the third device, or set the IP address and/or the port number as an IP address and/or a port number in an SDP message body in a SIP message, and send the SIP message to the third device, to request the group data from the third device.

According to a fifth aspect, an embodiment of the present disclosure provides a device, including a memory and a processor, where the memory and the processor are connected using a bus, the memory stores an instruction for implementing the data communication method described in the first aspect, and the processor invokes and executes the instruction in the memory in order to implement the data communication method described in the first aspect.

According to a sixth aspect, an embodiment of the present disclosure provides a device, including a memory and a processor, where the memory and the processor are connected using a bus, the memory stores an instruction for implementing the data communication method described in the second aspect, and the processor invokes and executes the instruction in the memory in order to implement the data communication method described in the second aspect.

According to the embodiments of the present disclosure, a first device receives a request message sent by at least one second device, where the request message is used to request the first device to forward group data, and the request message carries a group identifier. The first device returns a response message to the at least one second device, where the response message carries a layer-2 address and an IP address that are corresponding to the group identifier, and the first device sends the group data using the layer-2 address when receiving the group data that is sent by a third device to the IP address. According to the embodiments of the present disclosure, the first device sends the group data using the layer-2 address such that one or more second devices that have requested the group data from the first device can receive the group data at the layer-2 address, thereby improving data transmission efficiency.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The present disclosure provides a data communication method and a device. A first device receives a request message sent by at least one second device. The request message is used to request the first device to forward group data, and the request message carries a group identifier. The first device returns a response message to the at least one second device, and the response message carries a layer-2 address and an IP address that are corresponding to the group identifier. When receiving the group data that is sent by a third device to the IP address, the first device sends the group data using the layer-2 address. According to the embodiments of the present disclosure, when at least one second device needs to obtain same group data from the third device, only one of the at least one second device needs to have a unicast communication connection to the third device. The unicast communication connection is used to receive the group data. The first device forwards, to the at least one second device that needs to obtain the group data, the group data that is sent by the third device to the second device. Therefore, data transmission efficiency can be improved.

It should be noted that terms "first device", "second device", and "third device" in the embodiments of the present disclosure are merely used for description. The "second device" is a device that needs to obtain data, and for example, the second device may be a remote terminal that is out of network coverage. The "first terminal" is a device for forwarding data, and for example, the first device may be a relay terminal. The "third device" is a device for providing data, and for example, the third device may be a server. In specific implementation, the first device is a device that is in network coverage, and the second device may be a device that is out of network coverage, or a device that is in network coverage. This is not limited in the embodiments of the present disclosure. All methods for performing data communication based on a processing procedure in the embodiments of the present disclosure shall fall within the protection scope of the embodiments of the present disclosure. With reference to FIG. 1B to FIG. 12, the following separately describes in detail a data communication method and a terminal that are provided in the embodiments of the present disclosure.

Figure 1A:
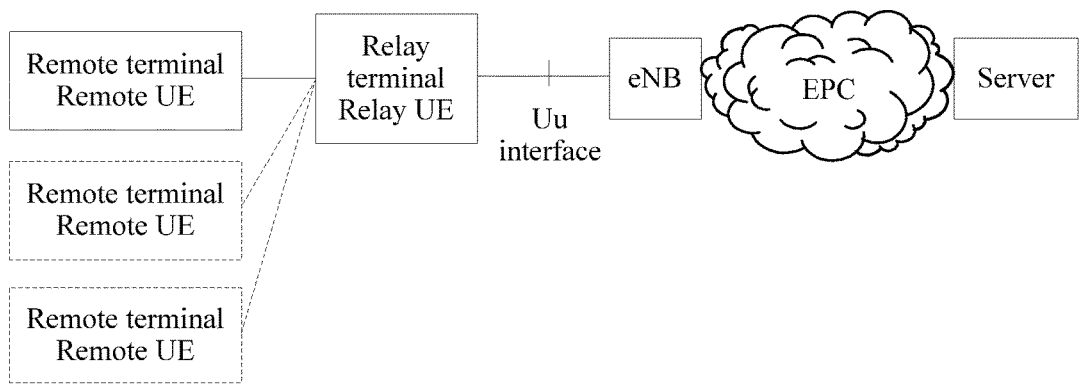
FIG. 1A is a schematic diagram of a network architecture.
Figure 1B:
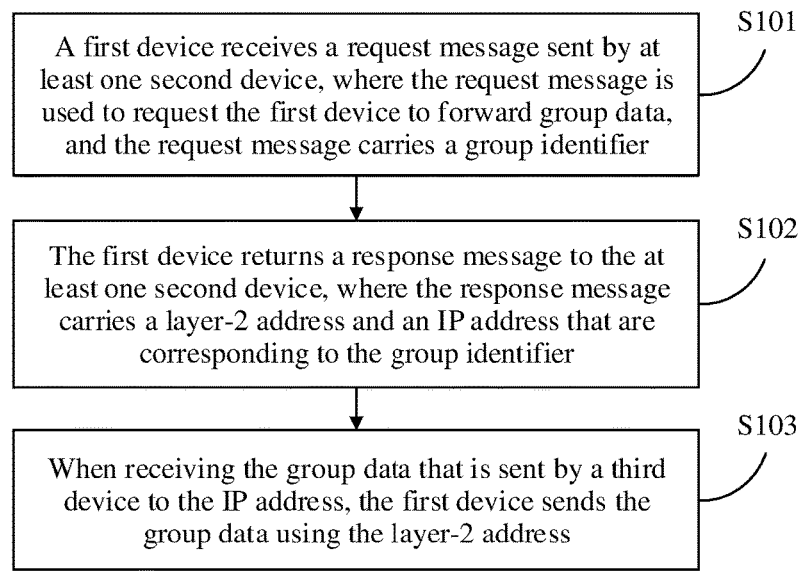
FIG. 1B is a schematic flowchart of a data communication method according to an embodiment of the present disclosure.

Referring to FIG. 1B, FIG. 1B is a schematic flowchart of a data communication method according to an embodiment of the present disclosure. In this embodiment of the present disclosure, the data communication method may include the following steps.

Step S101: A first device receives a request message sent by at least one second device, where the request message is used to request the first device to forward group data, and the request message carries a group identifier.

In a specific implementation, the second device may be a device that is out of network coverage, and certainly, the second device is not limited to this type of device in specific implementation, or the second device may be a device that is in network coverage. This is not limited in this embodiment of the present disclosure. However, it should be noted that the first device is a device that is in network coverage.

In this embodiment of the present disclosure, the second device performs data communication with a network side using the first device. For example, the second device obtains group data from a third device. In specific implementation, when the second device needs to obtain group data from the third device, the second device sends a request message to the first device, and adds, to the request message, a group identifier corresponding to the group data that needs to be obtained. Then the first device receives the request message sent by the at least one second device, and the request message carries the group identifier corresponding to the group data that needs to be obtained by the second device such that the first device forwards the group data after receiving the group data sent by the third device. For ease of description, in this embodiment of the present disclosure, one or more second devices that request same group data are referred to as a group of second devices. That is, the at least one second device is a group of second devices. The first device receives request messages of the group of second devices, and the request messages carry a same group identifier. It should be noted that, the at least one second device may be one second device, or may be multiple second devices, and the third device may be an application server (AS) such as a group server, or another device that can send group data. This is not limited in this embodiment of the present disclosure.

For ease of understanding, if at least two second devices are used as an example, request messages sent by the at least two second devices carry a same group identifier, that is, the at least two second devices request same group data. A group identifier is used to uniquely identify one piece of group data. In specific implementation, the group identifier may be a temporary mobile group identity (TMGI), an application layer identifier, or other information that can identify group data. This is not limited in this embodiment of the present disclosure. For ease of understanding, a specific example is as follows. It is assumed that the third device may provide three pieces of group data that are respectively "group data 1," "group data 2," and "group data 3," and group identifiers corresponding to the "group data 1," the "group data 2," and the "group data 3" are respectively "A," "B," and "C." If a request message sent by a second device carries the group identifier "A," it indicates that the second device expects to detect, by means of listening, the "group data 1" sent by the third device. If a request message sent by a second device carries the group identifier "B," it indicates that the second device expects to detect, by means of listening, the "group data 2" sent by the third device. If a request message sent by a second device carries the group identifier "C," it indicates that the second device expects to detect, by means of listening, the "group data 3" sent by the third device. It should be noted that, the specific example is merely used for description, but cannot be used to limit the protection scope of the present disclosure.

Step S102: The first device returns a response message to the at least one second device, where the response message carries a layer-2 address and an IP address that are corresponding to the group identifier.

After receiving the request message sent by the second device, the first device may automatically return, according to the group identifier carried in the request message, the response message corresponding to the group identifier, where the response message carries the layer-2 address and the IP address that are corresponding to the group identifier. In an optional embodiment, after receiving the request message sent by the second device, the first device may obtain, according to the group identifier carried in the request message, related parameters such as the layer-2 address and the IP address that are corresponding to the group identifier, and then returns the response message to the second device that sends the request message. The response message carries the layer-2 address and the IP address. This is not limited in this embodiment of the present disclosure. In this embodiment of the present disclosure, the layer-2 address is used to forward the group data to the second device such that the second device receives the group data on a link related to the layer-2 address. The IP address is an IP address that is allocated by the first device and that is used by the second device to request the group data from the third device. After receiving the response message returned by the first device, the second device may request the group data corresponding to the group identifier from the third device using the IP address carried in the response message.

In a feasible implementation manner, the first device may pre-save each group identifier and parameter information corresponding to the group identifier. The parameter information corresponding to the group identifier includes a layer-2 address and an IP address that are corresponding to the group identifier. After receiving the request message sent by the second device, the first device directly obtains, according to the group identifier carried in the request message, the layer-2 address and the IP address that are corresponding to the group identifier, and adds the layer-2 address and the IP address to the response message returned to the second device such that the second device learns that the group data that needs to be obtained can be received or listened to at the layer-2 address. In addition, the second device may further request the group data corresponding to the group identifier from the third device using the IP address, and at least one second device in the at least one second device successfully requests the group data corresponding to the group identifier from the third device using the IP address. Therefore, the first device may receive the group data that is sent by the third device to the IP address, and the third device does not need to send the group data to each second device.

In another feasible implementation manner, after receiving the request message sent by the second device, the first device determines whether the request message that carries the group identifier is received for the first time. If the request message that carries the group identifier is received for the first time, the first device allocates the layer-2 address and the IP address to the group identifier. If the request message that carries the group identifier is not received for the first time, the first device directly obtains the layer-2 address and the IP address that are corresponding to the group identifier. The layer-2 address and the IP address are a layer-2 address and an IP address that are allocated by the first device when the request message is received for the first time. After obtaining the layer-2 address and the IP address that are corresponding to the group identifier, the first device returns the response message to the second device, where the returned response message carries the layer-2 address and the IP address. In this embodiment of the present disclosure, after the first device receives the request message sent by the second device, if the request message that carries the group identifier is received for the first time, the layer-2 address and the IP address that are corresponding to the group identifier do not exist, or if the request message that carries the group identifier is not received for the first time, the layer-2 address and the IP address that are corresponding to the group identifier exist. Therefore, in an optional embodiment, whether the request message is received for the first time may be determined by checking whether a context corresponding to the group identifier exists. The context corresponding to the group identifier may be information such as the layer-2 address and the IP address that are corresponding to the group identifier. This is not limited in this embodiment of the present disclosure. If the context corresponding to the group identifier does not exist, it indicates that the first device receives, for the first time, the request message that carries the group identifier, and therefore, the first device allocates information such as the layer-2 address and the IP address to the group identifier. If the context corresponding to the group identifier exists, it indicates that the first device does not receive the request message for the first time, and therefore, the first device directly obtains information such as the layer-2 address and the IP address that are allocated when the request message is received for the first time. It should be noted that, in specific implementation, whether the first device receives the request message for the first time may be determined by setting a preset identifier. For example, it is assumed that "first time" and "non-first time" are respectively represented using "False" and "True." In specific implementation, the preset identifier may be set to be "False" by default. After receiving the request message, the first device obtains a preset identifier corresponding to the group identifier in the request message. If the preset identifier is "False," it indicates that the first device receives the request message corresponding to the group identifier for the first time, and the preset identifier is changed from "False" to "True." If the obtained preset identifier is "True," it indicates that the first device does not receive the request message corresponding to the group identifier for the first time. It should be noted that, in specific implementation, whether the request message is received for the first time may be determined in another manner. This is not limited in this embodiment of the present disclosure. In this embodiment of the present disclosure, that the first device allocates information such as the layer-2 address and the IP address to the group identifier after determining that the request message is received for the first time includes the first device allocates information such as the layer-2 address and the IP address after receiving the request message of the second device, or the first device pre-configures information such as the layer-2 address and the IP address, and selects a group of information such as the layer-2 address and the IP address from the pre-configured information after receiving the request message of the second device. This is not limited in this embodiment of the present disclosure.

In an optional embodiment, the response message may further carry a port number corresponding to the group identifier, and the port number is a port number that is allocated by the first device and that is used by the second device to request or receive the group data from the third device. Therefore, the second device may request the group data corresponding to the group identifier from the third device using the IP address and the port number that are allocated by the first device. It should be noted that, the port number for requesting or receiving the group data by the second device may be specified by the first device in the response message, or may be preset by the second device or the third device. This is not limited in this embodiment of the present disclosure. For ease of understanding, for example, it is assumed that a port number X1 is used by default when the second device requests "group data 1." When a request message sent by the second device to the first device carries a group identifier "A," the second device requests the "group data 1" from the third device using an IP address and the port number X1 if a response message returned by the first device does not carry a port number, or the second device requests the "group data 1" from the third device using an IP address and the port number if a response message returned by the first device carries a port number.

Step S103: When receiving the group data that is sent by a third device to the IP address, the first device sends the group data using the layer-2 address.

After receiving the response message returned by the first device, the second device may request the group data corresponding to the group identifier from the third device using the IP address carried in the response message such that the third device sends the group data to the IP address. The first device sends the group data to the at least one second device using the layer-2 address when receiving the group data that is sent by the third device to the IP address. Therefore, all second devices that have requested the group data from the first device may receive the group data on a link corresponding to the layer-2 address, and the third device does not need to transmit the group data to each second device, thereby improving data transmission efficiency.

In an optional implementation manner, after receiving the response message returned by the first device, one of the at least one second device successfully requests the group data from the third device using the IP address such that the third device sends the requested group data to the IP address. After receiving the group data that is sent by the third device to the IP address, the first device sends the group data using the layer-2 address such that all second devices that send the request message and receive the response message can listen to and receive the group data corresponding to the group identifier at the layer-2 address that is included in the response message.

According to the data communication method described in this embodiment of the present disclosure, a first device receives a request message sent by at least one second device, and the request message is used to request the first device to forward group data, and the request message carries a group identifier. The first device returns a response message to the at least one second device, and the response message carries a layer-2 address and an IP address that are corresponding to the group identifier. The first device sends the group data using the layer-2 address when receiving the group data that is sent by a third device to the IP address. According to this embodiment of the present disclosure, the first device sends, to one or more second devices that request the group data from the first device, the group data that is sent by the third device to the IP address, thereby improving data transmission efficiency.

Figure 2A:
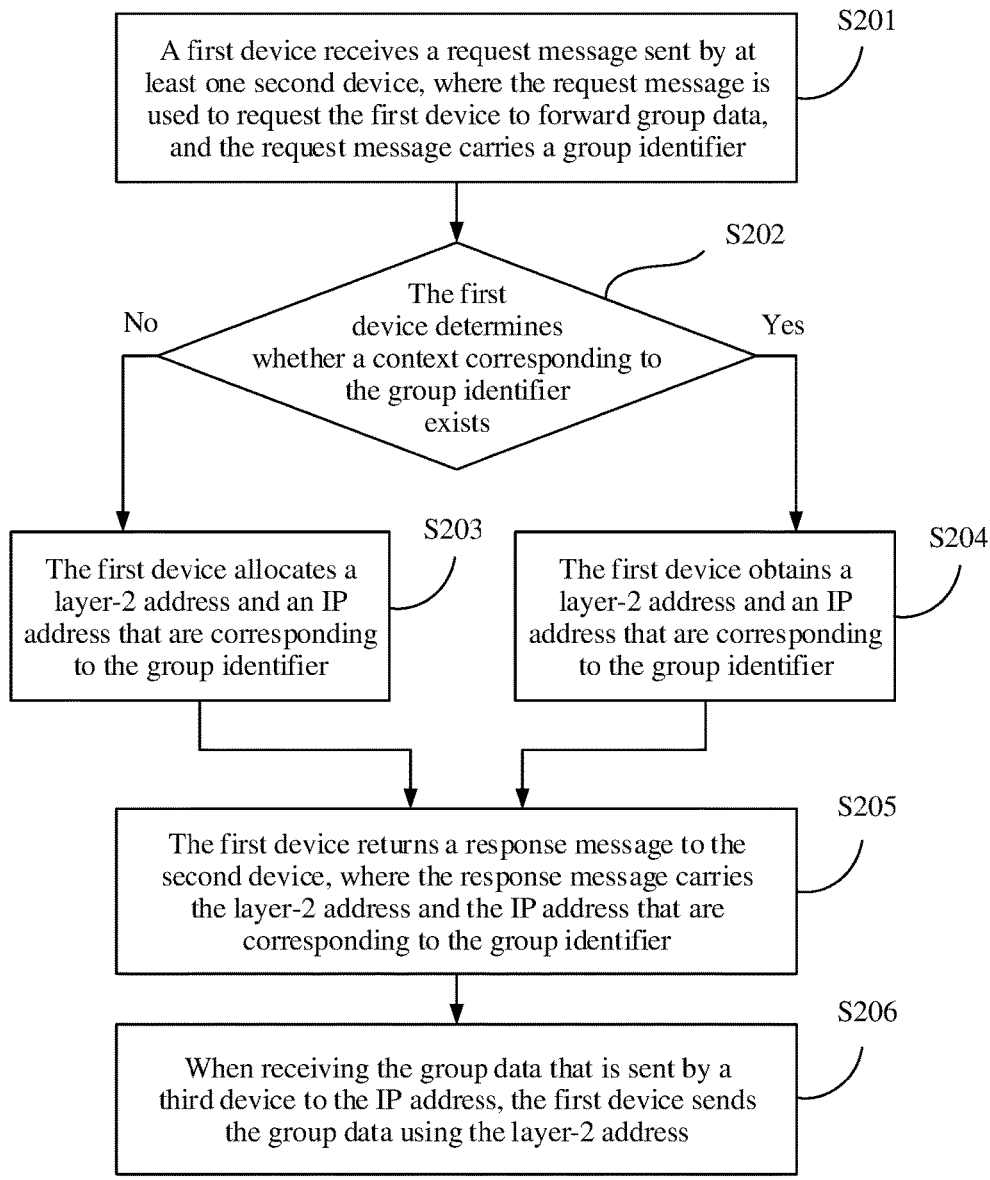
FIG. 2A is another schematic flowchart of a data communication method according to an embodiment of the present disclosure.

Referring to FIG. 2A FIG. 2A is another schematic flowchart of a data communication method according to an embodiment of the present disclosure. In this embodiment of the present disclosure, the data communication method may include the following steps.

Step S201: A first device receives a request message sent by at least one second device, where the request message is used to request the first device to forward group data, and the request message carries a group identifier.

In this embodiment of the present disclosure, the at least one second device requests same group data from the first device, that is, request messages sent by all second devices carry a same group identifier. In specific implementation, the second device may be a device that is out of network coverage, and certainly, the second device is not limited to this type of device in specific implementation, or the second device may be a device that is in network coverage. This is not limited in this embodiment of the present disclosure. However, it should be noted that the first device is a device that is in network coverage.

For ease of description, assuming that the second device is a device that is out of network coverage, when finding a device that is in network coverage, the second device may select the device as the first device, and the device that is used as the first device attaches to a network or an established packet data network (PDN) connection used for relay data transmission. Then, the second device establishes a communication connection to the first device such that the second device can communicate with a network side using the first device. In an optional embodiment, after the second device establishes the communication connection to the first device, the second device may further request to obtain an IP address from the first device, and the first device may allocate the IP address to the second device as an IP version 6 (IPV6) router or a Dynamic Host Configuration Protocol (DHCP) server. Therefore, the first device allocates the IP address to the second device. Further, after obtaining the IP address, the second device may communicate with a third device. For example, the second device registers with the third device. Optionally, after successfully registering with the third device, the second device may further obtain, from the third device, related parameters such as a TMGI, a multicast group address, and a group identifier that are required by multicast group data. This is not limited in this embodiment of the present disclosure.

When the second device needs to obtain the group data, because the second device is out of network coverage, the second device performs data communication with the network side using the first device. Therefore, when the second device needs to obtain group data from the network side, the second device sends a request message to the first device, to request the first device to forward the group data, where the request message carries group identifier information corresponding to the group data that needs to be requested. In specific implementation, multiple second devices may request same group data from the first device, and after receiving a request message sent by any second device, the first device returns a response message to each second device.

Step S202: The first device determines whether a context corresponding to the group identifier exists.

In this embodiment of the present disclosure, the context corresponding to the group identifier may be information such as a layer-2 address and an IP address that are used to forward the group data. Optionally, a port number may be further included. After receiving the request message sent by the second device, the first device parses the carried group identifier from the request message, and determines whether the context corresponding to the group identifier exists.

Step S203: The first device allocates the layer-2 address and the IP address that are corresponding to the group identifier.

If the context corresponding to the group identifier does not exist, it indicates that the group data corresponding to the group identifier is requested for the first time, that is, the first device receives, for the first time, the request message for requesting the group data. Therefore, the first device allocates, to the group identifier, the layer-2 address and the IP address that are used to forward the group data, or may further allocate the port number. The IP address is an IP address that is allocated by the first device and that is used by the second device to request or receive the group data from the third device. The port number is a port number that is allocated by the first device and that is used by the second device to request or receive the group data from the third device. Further, when the second device requests the group data, the second device requests the data from the third device using the IP address or the port number. The group data is received using the IP address or the port number as a destination IP address or a destination port number when the second device receives the group data.

In an optional embodiment, after allocating parameters to the group identifier, the first device associates the allocated parameters with the group identifier. Subsequently, if another second device sends a request message that carries the group identifier, after receiving the request message, the first device directly obtains parameters related to the group identifier. The parameters include the layer-2 address and the IP address, or may further include the port number.

In this embodiment of the present disclosure, that the first device allocates information such as the layer-2 address and the IP address to the group identifier includes that the first device allocates information such as the layer-2 address and the IP address after receiving the request message of the second device, or the first device pre-configures information such as the layer-2 address and the IP address, and selects a group of information such as the layer-2 address and the IP address from the pre-configured information after receiving the request message of the second device. This is not limited in this embodiment of the present disclosure.

Step S204: The first device obtains the layer-2 address and the IP address that are corresponding to the group identifier.

If the context corresponding to the group identifier exists, the group data corresponding to the group identifier is not requested for the first time, that is, before the second device requests the group data, another second device has requested the group data from the first device. Therefore, the first device directly obtains the layer-2 address and the IP address that are corresponding to the group identifier, or may further obtain the port number. It should be noted that the layer-2 address, the IP address, and the port number are a layer-2 address, an IP address, and a port number that are allocated by the first device when the request message is received for the first time.

Step S205: The first device returns a response message to the second device, where the response message carries the layer-2 address and the IP address that are corresponding to the group identifier.

After obtaining parameters corresponding to the group identifier, the first device returns the response message to the second device, where the response message carries the parameters corresponding to the group identifier, and the parameters corresponding to the group identifier include the layer-2 address and the IP address that are corresponding to the group identifier, or may further include the port number corresponding to the group identifier. In specific implementation, when the first device receives a request message sent by one of the at least one second device, if the context corresponding to the group identifier does not exist, the first device allocates, to the group identifier, the layer-2 address and the IP address that are corresponding to the group identifier, and then adds the allocated layer-2 address and the allocated IP address to the response message returned to the second device, or if the context corresponding to the group identifier exists, the first device obtains, according to the group identifier, the layer-2 address and the IP address that are corresponding to the group identifier, and then adds the obtained layer-2 address and the obtained IP address to the response message returned to the second device.

In a feasible implementation manner, if the context corresponding to the group identifier does not exist, the response message may further carry a unicast indication identifier such that the second device requests the group data from the third device using the IP address. Optionally, if the response message further carries the port number, the second device requests the group data from the third device using the IP address and the port number. Therefore, the first device may receive the group data that is sent by the third device to the second device in a unicast manner. If the response message does not carry unicast indication identifier, the second device may not need to request the group data from the third device. The third device may be a server or another device for sending group data, and this is not limited in this embodiment of the present disclosure. In an optional embodiment, after returning the response message to the second device, the first device may further broadcast the group identifier or information corresponding to the group identifier. Therefore, subsequently, if another second device needs to request the data corresponding to the group identifier from the first device, and the group identifier or the information corresponding to the group identifier has been detected by means of listening, it indicates that the first device can forward the group data. Therefore, after receiving the response message returned by the first device, the second device that subsequently requests the group data does not need to request the group data from the third device using the IP address (or the port number) carried in the response message. In this embodiment of the present disclosure, the broadcasted information corresponding to the group identifier may be a group identifier in another form, for example, an encoded group identifier, or other information about a group corresponding to the group identifier, such as address information of the group. This is not limited in this embodiment of the present disclosure. In an optional embodiment, the response message may further carry an update timer corresponding to the group identifier, and each newly specified update timer has preset duration. Therefore, the update timer may be used to indicate remaining duration for broadcasting the group identifier. When the remaining duration corresponding to the update timer is 0, if the second device still expects to continue to listen to the group data, the second device needs to send another request message to the first device, and the first device performs step S201, or the first device stops forwarding the group data and deletes information such as the context in the request if the second device does not expect to continue to listen to the group data. Therefore, power consumption of a terminal can be effectively reduced, and a service life of the terminal can be extended.

Step S206: When receiving the group data that is sent by a third device to the IP address, the first device sends the group data using the layer-2 address.

In an optional embodiment, if the response message further carries the port number, when a relay device receives the group data that is sent by the third device to the IP address and the port number, the first device sends the group data to the at least one second device using the layer-2 address. It should be noted that the sending may be performed in a multicast manner or in a broadcast manner, and this is not limited in this embodiment of the present disclosure. Therefore, all second devices that have requested the group data from the first device may receive the group data on a link corresponding to the layer-2 address, and the third device does not need to transmit the group data to each second device, thereby improving data transmission efficiency.

In this embodiment of the present disclosure, the first device determines the corresponding layer-2 address and the corresponding IP address according to the group identifier carried in the request message sent by the second device. Therefore, provided that second devices expect to request same group data, response messages returned by the first device carry same parameters (including a layer-2 address and an IP address). Once receiving the group data that is sent by the third device to the IP address, the first device forwards the group data using the layer-2 address such that all second devices that have sent the request message that carries the group identifier to the first device and have received the response message can listen to and receive the group data corresponding to the group identifier.

According to the data communication method described in this embodiment of the present disclosure, a first device receives a request message sent by at least one second device, and the request message is used to request the first device to forward group data, and the request message carries a group identifier. The first device returns a response message to the at least one second device, and the response message carries a layer-2 address and an IP address that are corresponding to the group identifier. When receiving the group data that is sent by a third device to the IP address, the first device sends the group data to the at least one second device using the layer-2 address. According to this embodiment of the present disclosure, the first device sends, to one or more second devices that request the group data from the first device, the group data that is sent by the third device to the IP address, thereby improving data transmission efficiency.

Figure 2B:
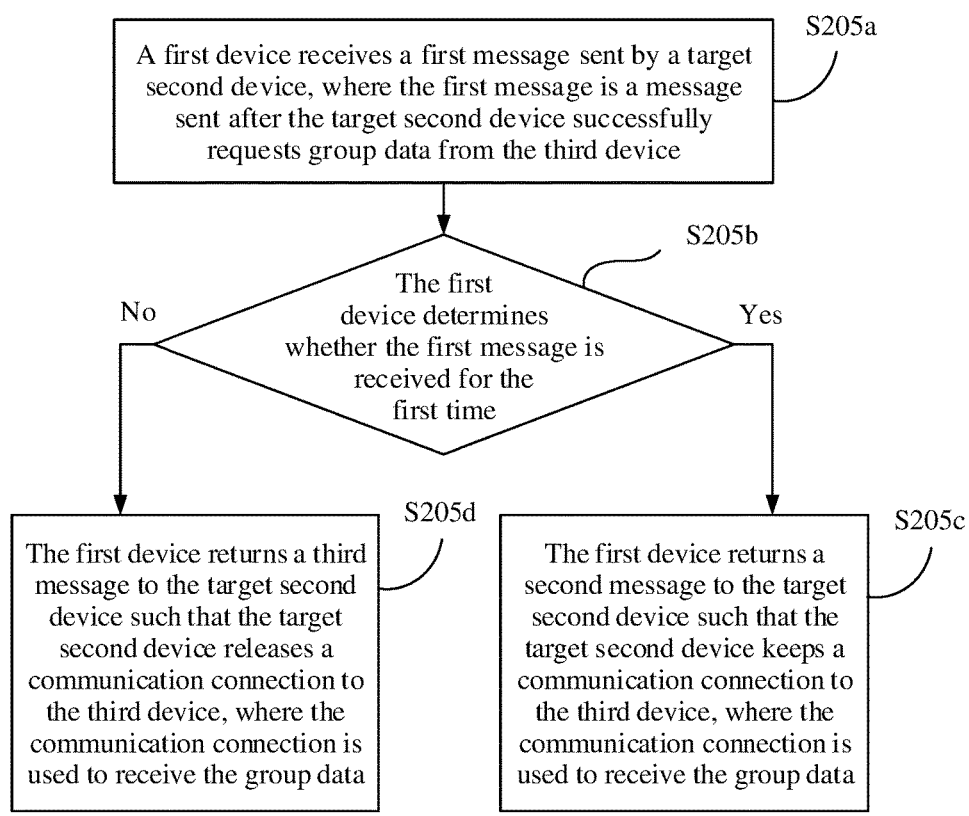
FIG. 2B is still another schematic flowchart of a data communication method according to an embodiment of the present disclosure.

It should be noted that, in the foregoing embodiment, after the first device returns the response message to the second device, the second device may request the group data corresponding to the group identifier from the third device using the IP address carried in the response message or the IP address and the port number that are carried in the response message. In an optional embodiment, after receiving the response message, the second device may automatically request the group data corresponding to the group identifier from the third device according to the response message. In another optional embodiment, after receiving the response message, if the second device fails to detect the group identifier or the information corresponding to the group identifier by means of listening, the second device requests the group data corresponding to the group identifier from the third device according to the response message, or if the second device may detect the group identifier or the information corresponding to the group identifier by means of listening, it indicates that a second device has successfully requested the group data from the third device, and the first device can forward the data group. Therefore, the second device does not need to request the group data from the third device after receiving the response message. In another optional embodiment, after the second device receives the response message, if the response message carries the unicast indication identifier, it indicates that a request for forwarding the group data is received for the first time, and the second device needs to establish a communication connection to the third device, where the communication connection is used to transmit the group data, and then requests the group data corresponding to the group identifier from the third device according to the response message. If the response message does not carry the unicast indication identifier, the second device does not request the group data corresponding to the group identifier from the third device. In this embodiment of the present disclosure, after the first device returns the response message to the second device, the data communication method may further include steps S205a to S205d. As shown in FIG. 2B, FIG. 2B is still another schematic flowchart of a data communication method according to an embodiment of the present disclosure.

Step S205a: The first device receives a first message sent by a target second device, where the first message is a message sent after the target second device successfully requests the group data from the third device.

After the second device sends the request message to the first device, the first device returns the response message. If the response message does not carry the port number, the second device may request the group data from the third device using the IP address carried in the response message. Optionally, if the response message carries the port number, the second device may request the group data from the third device using the IP address and the port number that are carried in the response message. After successfully requesting the group data from the third device, the second device sends the first message to the first device. In this embodiment of the present disclosure, at least one second device (for ease of description, the at least one second device is referred to as the target second device in this embodiment of the present disclosure) successfully requests the group data from the third device. After successfully requesting the group data from the third device, the target second device sends the first message to the first device to notify the first device that a communication connection to the third device is successfully established, where the communication connection is used to transmit the group data. The first device receives the first message sent by the target second device, where the first message is a message sent after the target second device successfully requests the group data from the third device.

In an optional embodiment, after the second device receives the response message returned by the first device, if the second device fails to detect the group identifier or the information corresponding to the group identifier by means of listening, the second device requests the group data from the third device using the IP address carried in the response message or using the IP address and the port number that are carried in the response message, and sends the first message to the first device after successfully requesting the group data from the third device. The first device receives the first message sent by the target second device in the at least one second device. The target second device refers to any second device that is in the at least one second device, fails to detect the group identifier or the information corresponding to the group identifier by means of listening, but successfully requests the group data from the third device. The first message is a message sent after the target second device successfully requests the group data from the third device, and is used to notify the first device that the communication connection to the third device is successfully established, where the communication connection is used to transmit the group data.

Step S205b: The first device determines whether the first message is received for the first time.

In this embodiment of the present disclosure, the at least one second device includes one or more second devices. Regardless of a quantity of second devices, only one of the at least one second device needs to keep the communication connection to the third device, where the communication connection is used to transmit the group data. Therefore, after the first device receives the first message corresponding to the group identifier sent by the target second device in the at least one second device, the first device determines whether the first message is received for the first time. If the first message is received for the first time, it indicates that the first device selects the communication connection between the second device and the third device to transmit the group data, and the first device returns a second message to any second device such that the target second device keeps the communication connection to the third device, where the communication connection is used to receive the group data. If the first message is not received for the first time, it indicates that another target second device has successfully requested the group data from the third device before the target second device returns the first message, and the first device returns a third message to the target second device such that the target second device releases the communication connection to the third device, where the communication connection is used to receive the group data. Therefore, it is ensured that only one of the at least one second device has a communication connection to the third device, where the communication connection is used to transmit the group data. After receiving the group data that is sent by the third device based on the communication connection, the first device sends the group data to the at least one second device using the layer-2 address, to implement unicast-to-multicast data relay, thereby improving data transmission efficiency.

Step S205c: The first device returns a second message to the target second device such that the target second device keeps a communication connection to the third device, where the communication connection is used to receive the group data.

If the first device determines that the first message is received for the first time, the first device returns the second message to the target second device such that the target second device keeps the communication connection to the third device, where the communication connection is used to receive the group data. Therefore, the target second device may continue to receive the group data from the third device. In an optional embodiment, after returning the second message, the first device may further broadcast the group identifier or the information corresponding to the group identifier. Therefore, when another second device expects to obtain the group data corresponding to the group identifier, if the other second device may detect the group identifier or the information corresponding to the group identifier by means of listening, the other second device does not need to request the group data from the third device, or if the other second device fails to detect the group identifier by means of listening, the other second device requests the group data from the third device to establish the communication connection to the third device, where the communication connection is used to transmit the group data. It should be noted that, the broadcasted information corresponding to the group identifier herein may refer to a group identifier in another form, for example, an encoded group identifier, or other information about a group corresponding to the group identifier, such as address information of the group. This is not limited in this embodiment of the present disclosure.

Step S205d: The first device returns a third message to the target second device such that the target second device releases the communication connection to the third device, where the communication connection is used to receive the group data.

If the first message is not received for the first time, it indicates that one of the at least one second device has successfully requested the group data from the third device and keeps the communication connection to the third device, where the communication connection is used to receive the group data. Therefore, the first device returns the third message to the current target second device such that the target second device releases the communication connection to the third device, where the communication connection is used to receive the group data.

It should be noted that, in this embodiment of the present disclosure, the "first message," the "second message," and the "third message" are merely used for description and are message names used to facilitate description of this solution. In specific implementation, the message names are not limited in this embodiment of the present disclosure, and cannot be used to limit the protection scope of the present disclosure.

In this embodiment of the present disclosure, it is ensured that only one of the at least one second device has the communication connection to the third device, where the communication connection is used to receive the group data. The first device sends the group data to the at least one second device using the layer-2 address when receiving the group data that is sent by the third device to the second device. Correspondingly, the at least one second device may listen to and receive the group data at the layer-2 address. According to this embodiment of the present disclosure, data transmission efficiency can be improved.

Figure 3:
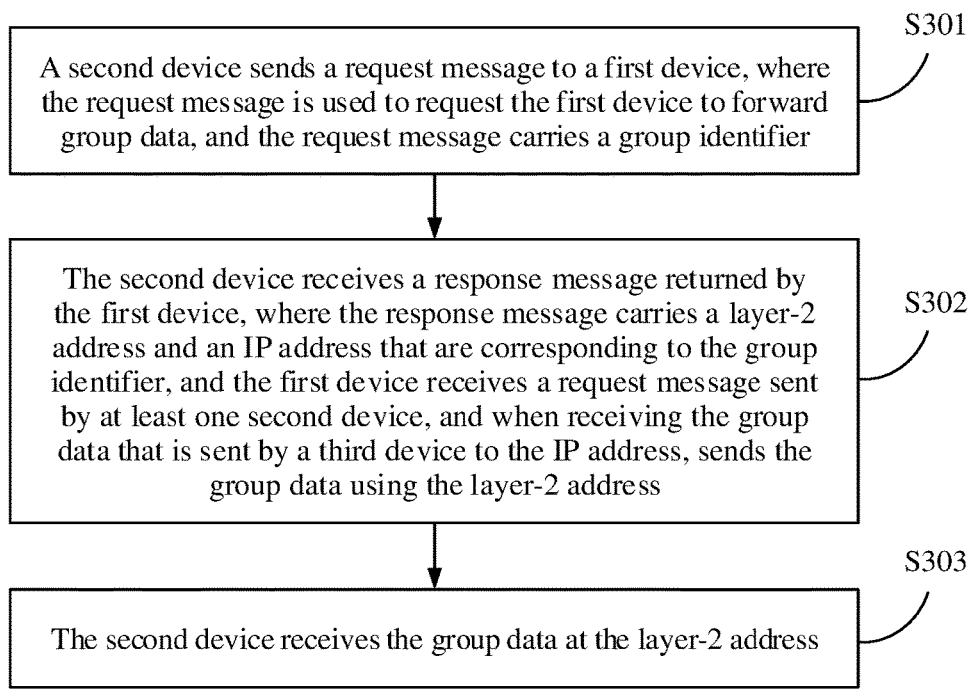
FIG. 3 is yet another schematic flowchart of a data communication method according to an embodiment of the present disclosure.

Referring to FIG. 3, FIG. 3 is yet another schematic flowchart of a data communication method according to an embodiment of the present disclosure. In this embodiment of the present disclosure, the data communication method may include the following steps.

Step S301: A second device sends a request message to a first device, where the request message is used to request the first device to forward group data, and the request message carries a group identifier.

In this embodiment of the present disclosure, the first device receives a request message for requesting the group data by at least one second device. Request messages sent by the at least one second device carry a same group identifier, that is, the at least one second device requests same group data. The first device forwards the group data using a layer-2 address when receiving the group data that is sent by a third device to one of the at least one second device. Therefore, after receiving the request message for requesting the group data by the at least one second device, the first device returns a response message to each second device, where the response message carries the layer-2 address such that one or more second devices that have requested the group data from the first device and have received the response message can listen to and receive the group data at the layer-2 address, and received unicast data can be sent to the multiple second devices in a multicast manner.

In a specific implementation, the group identifier may be a TMGI, an application layer identifier, or other information that can identify group data. This is not limited in this embodiment of the present disclosure. It should be noted that, in this embodiment of the present disclosure, for some technical details related to the foregoing embodiment, refer to the foregoing embodiment. Details are not repeatedly described herein.

Step S302: The second device receives a response message returned by the first device, where the response message carries a layer-2 address and an IP address that are corresponding to the group identifier, and the first device receives a request message sent by at least one second device, and when receiving the group data that is sent by a third device to the IP address, sends the group data using the layer-2 address.

After the second device sends, to the first device, a request message for requesting group data, the first device returns a response message according to a group identifier carried in the request message, and the second device receives the response message returned by the first device, where the response message carries a layer-2 address and an IP address that are corresponding to the group identifier. The IP address is an IP address that is allocated by the first device and that is used by the second device to request the group data from the third device. The layer-2 address is used by the first device to send the received group data to the at least one second device. Therefore, the second device can receive the group data at the layer-2 address. In an optional embodiment, the second device requests the group data from the third device using the IP address in order to establish a communication connection to the third device, where the communication connection is used to receive the group data distributed in a unicast manner.

In a feasible implementation manner, the response message may further carry a port number corresponding to the group identifier, and the port number is a port number that is allocated by the first device and that is used by the second device to request the group data. In an optional embodiment, the second device requests the group data from the third device using the IP address and the port number in order to establish a communication connection to the third device, where the communication connection is used to receive the group data distributed in a unicast manner.

Step S303: The second device receives the group data at the layer-2 address.

If the first device receives the group data that is sent by the third device to the IP address, the first device sends the group data to the at least one second device using the layer-2 address such that at least one second device that has requested the group data from the first device and has received the response message can receive the group data at the layer-2 address.

According to the data communication method described in this embodiment of the present disclosure, a second device sends a request message to a first device, where the request message carries a group identifier. The second device receives a response message returned by the first device, where the response message carries a layer-2 address and an IP address that are corresponding to the group identifier, and when receiving the group data that is sent by a third device to the IP address, the first device sends the group data using the layer-2 address, and the second device receives the group data at the layer-2 address. According to this embodiment of the present disclosure, the first device forwards, using the layer-2 address, the group data that is sent by the third device to the IP address such that one or more second devices that have requested the group data from the first device can receive the group data at the layer-2 address, thereby improving data transmission efficiency.

Figure 4A:
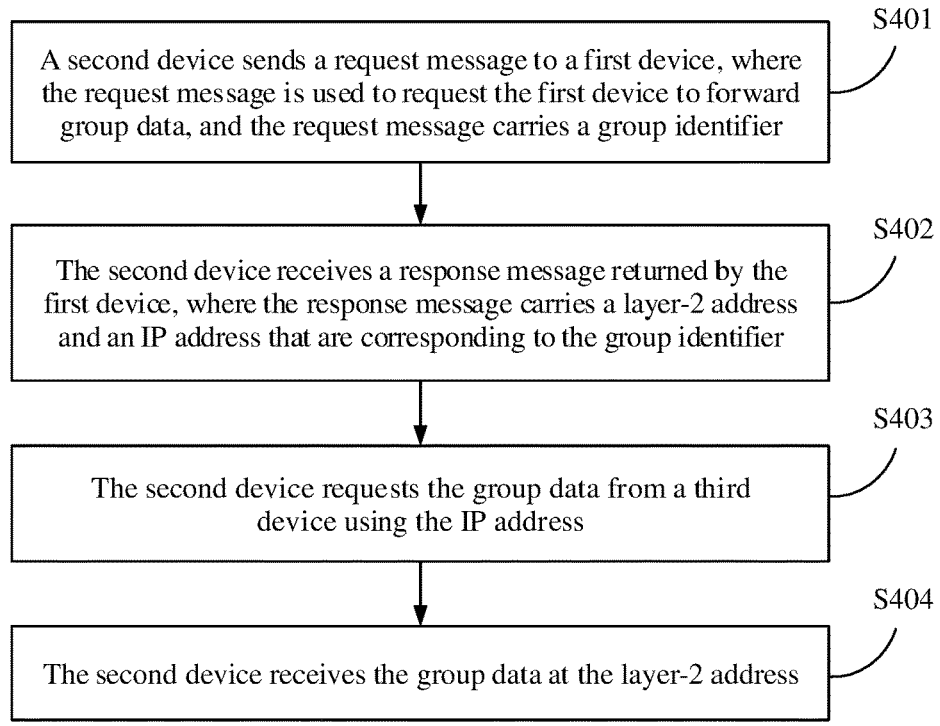
FIG. 4A is still yet another schematic flowchart of a data communication method according to an embodiment of the present disclosure.

Referring to FIG. 4A, FIG. 4A is still yet another schematic flowchart of a data communication method according to an embodiment of the present disclosure. In this embodiment of the present disclosure, the data communication method may include the following steps.

Step S401: A second device sends a request message to a first device, where the request message is used to request the first device to forward group data, and the request message carries a group identifier.

In this embodiment of the present disclosure, the second device sends the request message to the first device, where the request message carries the group identifier. Therefore, the first device receives a request message sent by at least one second device, and the at least one second device requests the first device to forward same group data, that is, request messages sent by all second devices carry a same group identifier. It should be noted that, the same group identifier refers to identifier information that can be used to identify a same group, and identifier information that is in different forms but is used to identify a same group also belongs to the same group identifier. This embodiment of the present disclosure is not limited to consistent identifier information.

Step S402: The second device receives a response message returned by the first device, where the response message carries a layer-2 address and an IP address that are corresponding to the group identifier.

In this embodiment of the present disclosure, the IP address is an IP address that is allocated by the first device and that is used by the second device to request the group data from a third device such that the at least one second device that sends the request message to the first device can establish a unicast session channel to the third device using the IP address, where the unicast session channel is used to receive the group data. The layer-2 address is used by the second device to send the received group data to the at least one second device such that the second device can receive the group data at the layer-2 address. In an optional embodiment, the response message further carries a port number corresponding to the group identifier, and the port number is a port number that is allocated by the first device and that is used by the second device to request the group data from the third device such that the at least one second device that sends the request message to the first device can establish a unicast session channel to the third device using the IP address and the port number, where the unicast session channel is used to receive the group data. It should be noted that, the IP address and the port number may be further used by the second device to receive the group data. When the second device receives the group data, the group data is received using the IP address and the port number as a destination IP address and a destination port number. It should be noted that the port number is optional in this specific implementation.

In a specific implementation, after receiving the request message sent by the second device, the first device parses the group identifier from the request message to obtain the layer-2 address and the IP address that are corresponding to the group identifier. Optionally, the port number is further included. Then the first device returns the response message to the second device, where the response message carries the obtained layer-2 address and the obtained IP address, or further carries the port number. In this embodiment of the present disclosure, if request messages sent by second devices carry a same group identifier, response messages received from the first device carry a same layer-2 address and a same IP address, or further carry a same port number.

Step S403: The second device requests the group data from the third device using the IP address.

After receiving the response message returned by the first device, the second device may request the group data from the third device using the IP address carried in the response message. In an optional embodiment, if the response message further carries the port number, the second device requests the group data from the third device using the IP address and the port number.

In a specific implementation, that the second device requests the group data from the third device may be as follows. The second device establishes a communication connection to the third device in order to receive, from the third device, the group data distributed in a unicast manner, where the communication connection is used to receive the group data. According to whether the first device supports an application layer gateway-network address translation (ALG-NAT) function, the communication connection may be established in two implementation manners.

In an implementation manner, if the first device supports the ALG-NAT, the second device performs media negotiation with the third device to establish an application layer session, sends, to the third device using an application layer message, an IP address and a port number that are used by the second device to transmit data, and receives an application layer message including an IP address and a port number that are of the third device and that are used by the third device to send data in order to establish the communication connection between the second device and the third device, where the communication connection is used to transmit unicast data. Further, when a SIP message is used, the second device uses the IP address as an IP address in an SDP message body in the SIP message, and sends the SIP message to the third device to request the group data from the third device in order to establish the communication connection to the third device, where the communication connection is used to receive data distributed in a unicast manner. SIP is a text-based application layer control protocol, and is used to create, modify, and release a session of one or more participants. SDP is a multimedia session description provided for purposes of session announcement, session invitation, initialization of a multimedia session in another form, and the like. Optionally, if the response message further carries the port number, the second device performs media negotiation with the third device to establish an application layer session. Further, the second device uses the IP address and the port number as an IP address and a port number in an SDP message body in a SIP message, and sends the SIP message to the third device, to request the group data from the third device.

In another implementation manner, if the first device does not support the ALG-NAT, the second device uses the IP address as a source IP address of a data packet that is used to transmit application signaling, and sends the data packet to the third device to request the group data from the third device in order to establish the communication connection to the third device, where the application signaling indicates, to the third device, the IP address that is used by the second device to transmit data distributed in a unicast manner, and the communication connection is used to receive the data distributed in a unicast manner. Optionally, if the response message further carries the port number, the second device uses the IP address and the port number as a source IP address and a source port number of a data packet that is used to transmit application signaling, and sends the data packet to the third device, to request the group data from the third device.

For ease of understanding, assuming that the response message carries the port number, the second device requests the group data from the third device using the IP address and the port number. Because the second device needs to use the first device to communicate with a network side, the foregoing IP address and the foregoing port number are an IP address and a port number that are allocated by the first device and that are used by the second device to transmit the data distributed in a unicast manner. If the first device has a network address translation (NAT) function, when the third device sends the group data to the second device, the group data that is supposed to be sent to the IP address and the port number is sent to the first device. The first device translates an IP address and a port number that are of the group data into the foregoing IP address and the foregoing port number by means of NAT, and then the first device performs forwarding.

In a feasible implementation manner, after receiving the response message returned by the first device, the second device automatically requests the group data from the third device using the IP address carried in the response message. Optionally, if the response message further carries the port number, after receiving the response message returned by the first device, the second device automatically requests the group data from the third device using the IP address and the port number that are carried in the response message in order to establish the communication connection that is used to receive the group data.

In another feasible implementation manner, after the second device receives the response message returned by the first device, if the second device may currently detect, by means of listening, the group identifier or information related to the group identifier, the second device does not need to request the group data from the third device, or if the second device fails to detect, by means of listening, the group identifier or information related to the group identifier, after the second device receives the response message returned by the first device, the second device requests the group data from the third device according to the response message.

In another feasible implementation manner, after the second device receives the response message returned by the first device, if the second device learns that the response message further carries a unicast indication identifier, the second device requests the group data from the third device according to the response message, or if the second device learns that the response message does not carry a unicast indication identifier, the second device does not need to request the group data from the third device after receiving the response message. In specific implementation, that the second device requests the group data from the third device according to the response message includes that the second device requests the group data from the third device using the IP address carried in the response message if the response message does not carry the port number, or the second device requests the group data from the third device using the IP address and the port number that are carried in the response message.

Figure 4B:
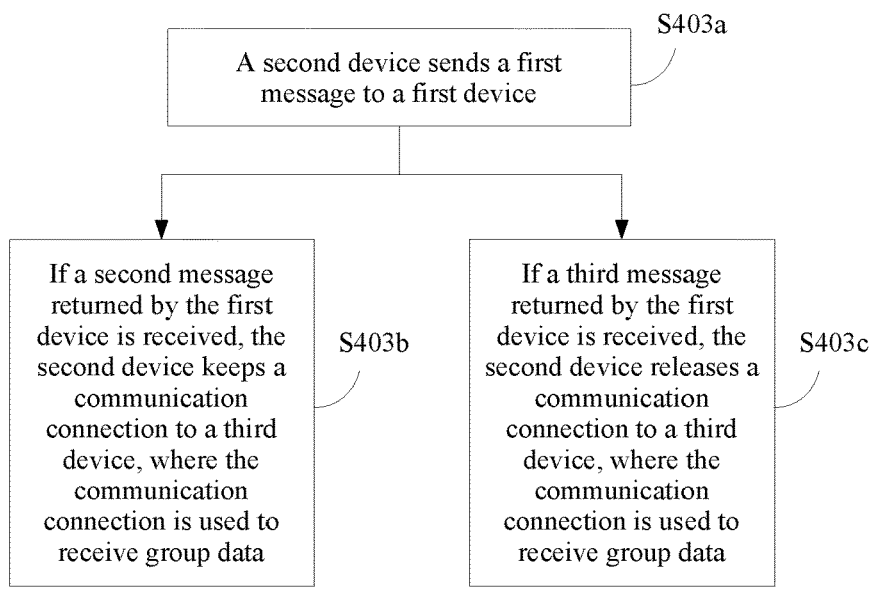
FIG. 4B is a schematic flowchart of a data communication method according to FIG. 4A.

It should be noted that, after the second device successfully requests the group data from the third device using the IP address carried in the response message or using the IP address and the port number that are carried in the response message, the method may further include steps S403a to S403c. As shown in FIG. 4B, FIG. 4B is a schematic flowchart of a data communication method according to FIG. 4A.

Step S403a: The second device sends a first message to the first device.

In this embodiment of the present disclosure, after the second device successfully requests the group data from the third device, the second device may further send the first message to the first device such that the second device notifies the first device that the second device has successfully requested the group data from the third device. In specific implementation, the first device receives a first message sent by a target second device in the at least one second device, where the first message is a message sent after the target second device successfully requests the group data from the third device. In an optional embodiment, if multiple second devices fail to detect the group identifier or information corresponding to the group identifier by means of listening but successfully request the group data from the third device, that is, establish a unicast communication connection to the third device, only one of the multiple second devices needs to keep the communication connection to the third device, where the communication connection is used to receive the group data distributed in a unicast manner. Therefore, after receiving a first message sent by any second device in the foregoing multiple second devices that fail to detect the group identifier or the information corresponding to the group identifier by means of listening but successfully requests the group data distributed in a unicast manner, the first device further determines whether the first message is received for the first time. If the first message is received for the first time, the first device returns a second message to the second device such that the second device keeps the communication connection to the third device, where the communication connection is used to receive the group data. If the first message is not received for the first time, the first device returns a third message to the second device such that the second device releases the communication connection to the third device, where the communication connection is used to receive the group data. The foregoing communication connection refers to a communication connection through which the second device receives, from the third device, the data distributed in a unicast manner.

Step S403b: If a second message returned by the first device is received, the second device keeps a communication connection to the third device, where the communication connection is used to receive the group data.

After the second device returns the first message to the first device, if the second message returned by the first device is received, it indicates that the first device selects the communication connection between the second device and the third device to transmit the group data. Therefore, the second device keeps the communication connection to the third device, where the communication connection is used to receive the group data such that the first device can receive the group data sent by a server.

Step S403c: If a third message returned by the first device is received, the second device releases the communication connection to the third device, where the communication connection is used to receive the group data.

After the second device returns the first message to the first device, if the third message returned by the first device is received, it indicates that before the second device successfully requests the group data from the third device, another second device has established a communication connection to the third device, where the communication connection is used to receive the group data. Therefore, the second device releases the communication connection to the third device, where the communication connection is used to receive the group data. Therefore, when multiple second devices need to obtain same group data from the third device, the third device only needs to transmit the group data based on an established communication connection such that the same group data is prevented from being repeatedly transmitted between the third device and the first device.

Step S404: The second device receives the group data at the layer-2 address.

If the first device receives the group data that is sent by the third device to the IP address, the first device forwards the group data using the layer-2 address such that one or more second devices that have requested the group data from the first device can listen to and receive the group data at the layer-2 address. In an optional embodiment, if the response message further carries the port number, when the first device receives the group data that is sent by the third device to the IP address and the port number, the first device forwards the group data using the layer-2 address such that all second devices that have requested the group data from the first device can listen to and receive the group data at the layer-2 address.

According to the data communication method described in this embodiment of the present disclosure, a second device sends a request message to a first device, where the request message carries a group identifier. The second device receives a response message returned by the first device, where the response message carries a layer-2 address and an IP address that are corresponding to the group identifier, and the first device sends the group data using the layer-2 address when receiving the group data that is sent by a third device to the IP address, and the second device receives the group data at the layer-2 address. According to this embodiment of the present disclosure, the first device forwards, using the layer-2 address, the group data that is sent by the third device to the IP address such that one or more second devices that have requested the group data from the first device can receive the group data at the layer-2 address, thereby improving data transmission efficiency.

Figure 5:
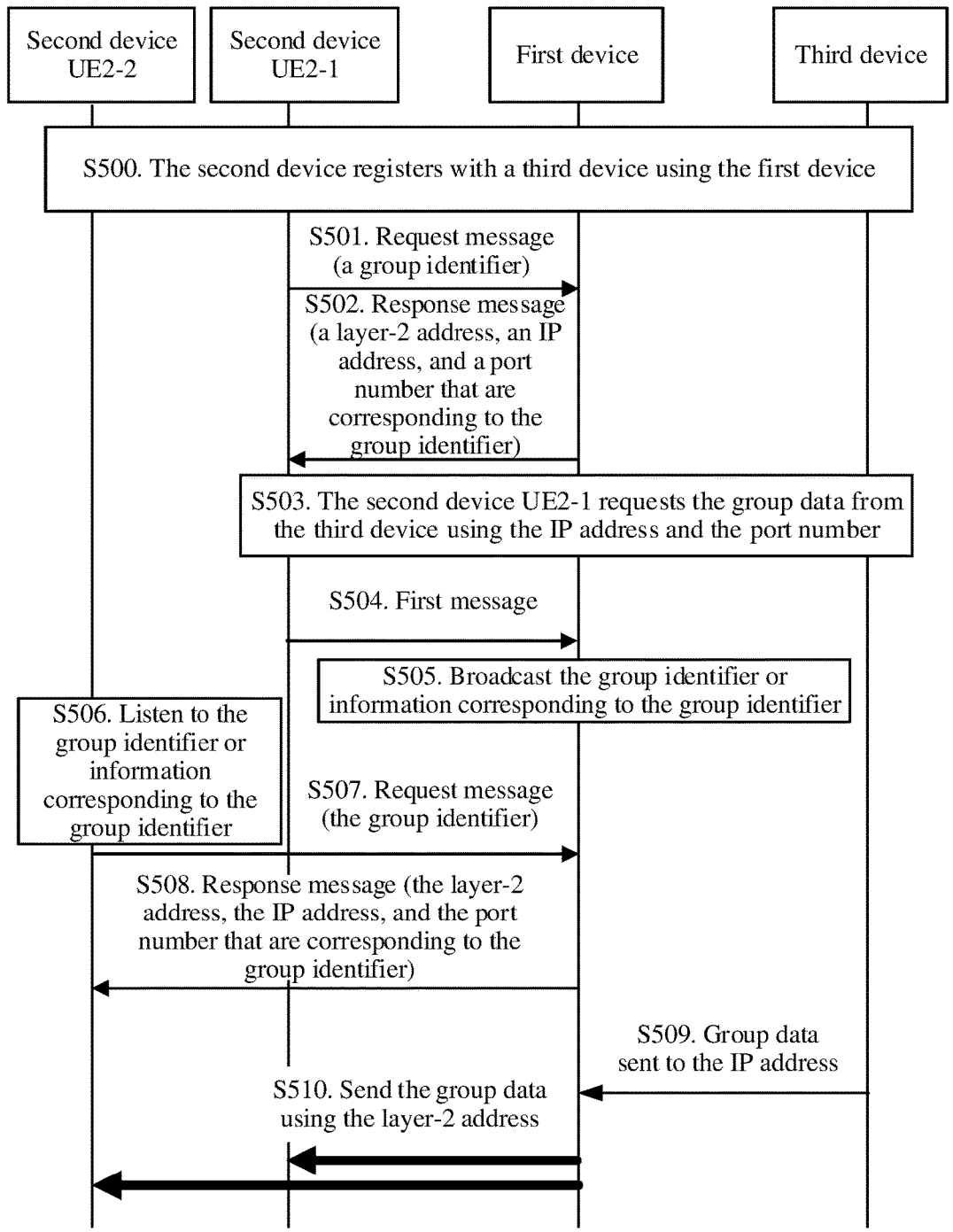
FIG. 5 is a schematic interaction diagram of a data communication method according to an embodiment of the present disclosure.

Referring to FIG. 5, FIG. 5 is a schematic interaction diagram of a data communication method according to an embodiment of the present disclosure. In this embodiment of the present disclosure, the data communication method may include the following steps.

In this embodiment of the present disclosure, a first device may receive a request message of one or more second devices, and request messages sent by the multiple second devices to the first device carry a same group identifier. For ease of description, in this embodiment of the present disclosure, when the group data is requested for the first time, a corresponding request terminal is referred to as a "second device UE2-1," and when the group data is not requested for the first time, a corresponding request terminal is referred to as a "second device UE2-2." It should be noted that the "second device UE2-1" and the "second device UE2-2" are merely used for description. In specific implementation, the "second device UE2-2" may refer to one or more second devices, and this is not limited in this embodiment of the present disclosure.

Step S500: The second device registers with a third device using the first device.

For ease of description, assuming that the second device is a device that is out of network coverage, when finding a first device that is in network coverage, the second device may select the first device as a relay terminal, and the first device that is used as the relay terminal attaches to a network or an established PDN connection used for relay data transmission. Then, the second device establishes a communication connection to the first device such that the second device can communicate with a network side using the first device. In an optional embodiment, after the second device establishes the communication connection to the first device, the second device may further request to obtain an IP address from the first device, and the first device may allocate the IP address to the second device as an IPV6 router or a DHCP server. Therefore, the first device allocates the IP address to the second device. Further, after obtaining the IP address, the second device may communicate with the third device. For example, the second device registers with the third device, or the second device transmits another application layer signaling message. Optionally, after successfully registering with the third device, the second device may further obtain, from the third device, related parameters such as a TMGI, a multicast group address, and a group identifier that are required by multicast group data. This is not limited in this embodiment of the present disclosure. It should be noted that the second device includes the "second device UE2-1" and the "second device UE2-2."

Step S501: The second device UE2-1 sends a request message to the first device, where the request message carries a group identifier.

When the second device UE2-1 needs to obtain group data from the third device, the second device UE2-1 sends a request message to the first device, and adds, to the request message, a group identifier corresponding to the group data that needs to be obtained. In this embodiment of the present disclosure, the request message is used to request the first device to forward the group data.

Step S502: The first device returns a response message to the second device UE2-1, where the response message carries a layer-2 address, an IP address, and a port number that are corresponding to the group identifier.

After receiving the request message sent by the second device UE2-1, the first device parses the group identifier from the request message, and directly obtains or allocates, according to the group identifier, the layer-2 address, the IP address, and the port number that are corresponding to the group identifier. The port number is optional. In specific implementation, the second device may receive the group data using a default specified port. The layer-2 address is used to send the group data to the second device when the first device receives the group data corresponding to the group identifier from the third device such that the second device UE2-1 listens to and receives the group data corresponding to the group identifier at the layer-2 address. The IP address and the port number are an IP address and a port number that are allocated by the first device and that are used by the at least one second device to request or receive the group data. It should be noted that, the at least one second device refers to all devices that have sent the request messages to the first device, and the request messages carry a same group identifier. It should be noted that, group identifiers carried in the request messages may identify same group data. This is not further limited in this embodiment of the present disclosure.

Optionally, because the group data is requested for the first time, the response message returned by the first device to the second device UE2-1 may further carry a unicast indication identifier such that after receiving the response message, the second device UE2-1 requests, according to the unicast indication identifier, to establish a communication connection to the third device, where the communication connection is used to transmit the group data.

Step S503: The second device UE2-1 requests the group data from the third device using the IP address and the port number.

After the second device UE2-1 receives the response message returned by the first device, if the second device UE2-1 fails to detect the group identifier or information corresponding to the group identifier by means of listening, the second device UE2-1 requests the group data corresponding to the group identifier from the third device using the IP address and the port number that are carried in the response message, that is, the second device UE2-1 establishes the communication connection to the third device. The information is used to indicate that the first device can forward the group data corresponding to the group identifier sent by the third device, and the communication connection is used to receive the group data corresponding to the group identifier.

Optionally, after the second device UE2-1 receives the response message returned by the first device, if the second device UE2-1 learns that the response message carries the unicast indication identifier, the second device UE2-1 establishes the communication connection to the third device using the IP address and the port number that are carried in the response message, where the communication connection is used to receive group data that is distributed in a unicast manner corresponding to the group identifier.

It should be noted that, if the response message returned in step S502 does not include the port number, the second device UE2-1 may establish the communication connection to the third device using the IP address carried in the response message or using the IP address carried in the response message and a default port number, where the communication connection is used to receive the group data corresponding to the group identifier. The default port number is a port number that is preset by the second device or the third device to request the group data corresponding to the group identifier.

Step S504: The second device UE2-1 sends a first message to the first device.

After successfully requesting the group data from the third device, the second device UE2-1 sends the first message to the first device such that the first device learns that the second device UE2-1 has successfully requested the group data from the third device, and the first device can receive the group data that is sent by the third device to the second device UE2-1. A destination IP address of the group data is the IP address returned in step S502. Optionally, a destination port number of the group data is the port number returned in step S502.

It should be noted that, in specific implementation, after receiving the first message sent by any second device in the at least one second device, the first device may further determine whether the first message is received for the first time. If the first message is received for the first time, the first device returns a second message to any second device such that any second device continues to receive the group data from the third device. If the first message is not received for the first time, the first device returns a third message to any second device such that any second device releases a communication connection to the third device, where the communication connection is used to receive the group data. For specific technical details, refer to the description part corresponding to FIG. 4B in the foregoing embodiment. Details are not repeatedly described herein.

Step S505: The first device broadcasts the group identifier or information corresponding to the group identifier.

After receiving the first message sent by the second device UE2-1, the first device learns that the second device UE2-1 has successfully requested the group data from the third device, and returns the second message. Then, the first device broadcasts the group identifier or the information corresponding to the group identifier such that all second devices learn that the first device can forward the group data sent by the third device. Therefore, when another second device also needs to receive the group data, the other second device only needs to directly send a request message to the first device without re-establishing a communication connection to the third device, where the communication connection is used to receive the group data. In specific implementation, when the first device receives the group data that is sent by the third device to the IP address, the first device sends the group data using the layer-2 address such that all second devices that have learned the layer-2 address from the first device can listen to and receive the group data.

Step S506: The second device UE2-2 listens to the group identifier or the information corresponding to the group identifier.

In a specific implementation, after the first device broadcasts the group identifier or the information corresponding to the group identifier, all second devices may detect the group identifier or the information corresponding to the group identifier by means of listening such that another second device can learn that the first device may currently forward the group data corresponding to the group identifier and that is sent by the third device. Therefore, if the second device UE2-2 also needs to receive the group data, the second device UE2-2 may send a request message to the first device, and adds the group identifier to the request message.

Step S507: The second device UE2-2 sends a request message to the first device, where the request message carries the group identifier.

In this embodiment of the present disclosure, the request messages sent by the second device UE2-2 and the second device UE2-1 carry the same group identifier. For other specific details, refer to step S501. Details are not repeatedly described herein.

Step S508: The first device returns a response message to the second device UE2-2, where the response message carries the layer-2 address, the IP address, and the port number that are corresponding to the group identifier.

After receiving the request message sent by the second device UE2-2, the first device parses the group identifier from the request message, and then it can be learned that the group identifier is the same as the group identifier carried in the request message sent by the second device UE2-1. In this embodiment of the present disclosure, because the first device has allocated, according to the group identifier, parameters corresponding to the group identifier, after receiving the request message sent by the second device UE2-2, the first device directly obtains the layer-2 address, the IP address, and the port number that are corresponding to the group identifier. It should be noted that the port number is optional.

Optionally, because the group data corresponding to the group identifier is not requested for the first time, the response message returned by the first device to the second device UE2-2 does not need to carry the unicast indication identifier. After receiving the response message, the second device UE2-2 does not need to establish a communication connection to the third device, where the communication connection is used to receive the group data. Alternatively, when receiving the response message returned by the first device, the second device UE2-2 may detect the group identifier or the information corresponding to the group identifier by means of listening, and then learns that another second device has established a communication connection to a server, where the communication connection is used to receive the group data corresponding to the group identifier. Therefore, the second device UE2-2 does not need to establish a communication connection to the third device, where the communication connection is used to receive the group data.

Step S509: The first device receives the group data that is sent by the third device to the IP address.

Step S510: The first device sends the group data using the layer-2 address to at least one of the second device UE2-1 and the second device UE2-2.

After receiving the response message returned by the first device, the second device UE2-1 successfully requests the group data corresponding to the group identifier from the third device using the IP address carried in the response message or using the IP address and the port number that are carried in the response message. Therefore, the third device sends the group data to the IP address, or the third device sends the group data to the IP address and the port number. When the first device receives the group data that is sent by the third device to the IP address, that is, when the first device receives group data whose destination address is the IP address, or when the first device receives group data whose destination address is the IP address and whose destination port number is the port number, the first device sends the group data to the at least one second device using the layer-2 address. Therefore, all second devices (for example, the second device UE2-1 and the second device UE2-2) that have requested the group data from the first device may receive the group data on a link corresponding to the layer-2 address, and the third device does not need to send the group data to each second device, thereby improving data transmission efficiency.

According to the data communication method described in this embodiment of the present disclosure, a first device receives a request message sent by at least one second device, and the request message carries a group identifier. The first device returns a response message to the at least one second device, and the response message carries a layer-2 address and an IP address that are corresponding to the group identifier. When receiving the group data that is sent by a third device to the IP address, the first device sends the group data using the layer-2 address such that the at least one second device can receive the group data at the layer-2 address. According to this embodiment of the present disclosure, the first device sends, to one or more second devices that request the group data from the first device, the group data that is sent by the third device to the IP address, thereby improving data transmission efficiency.

Figure 6:
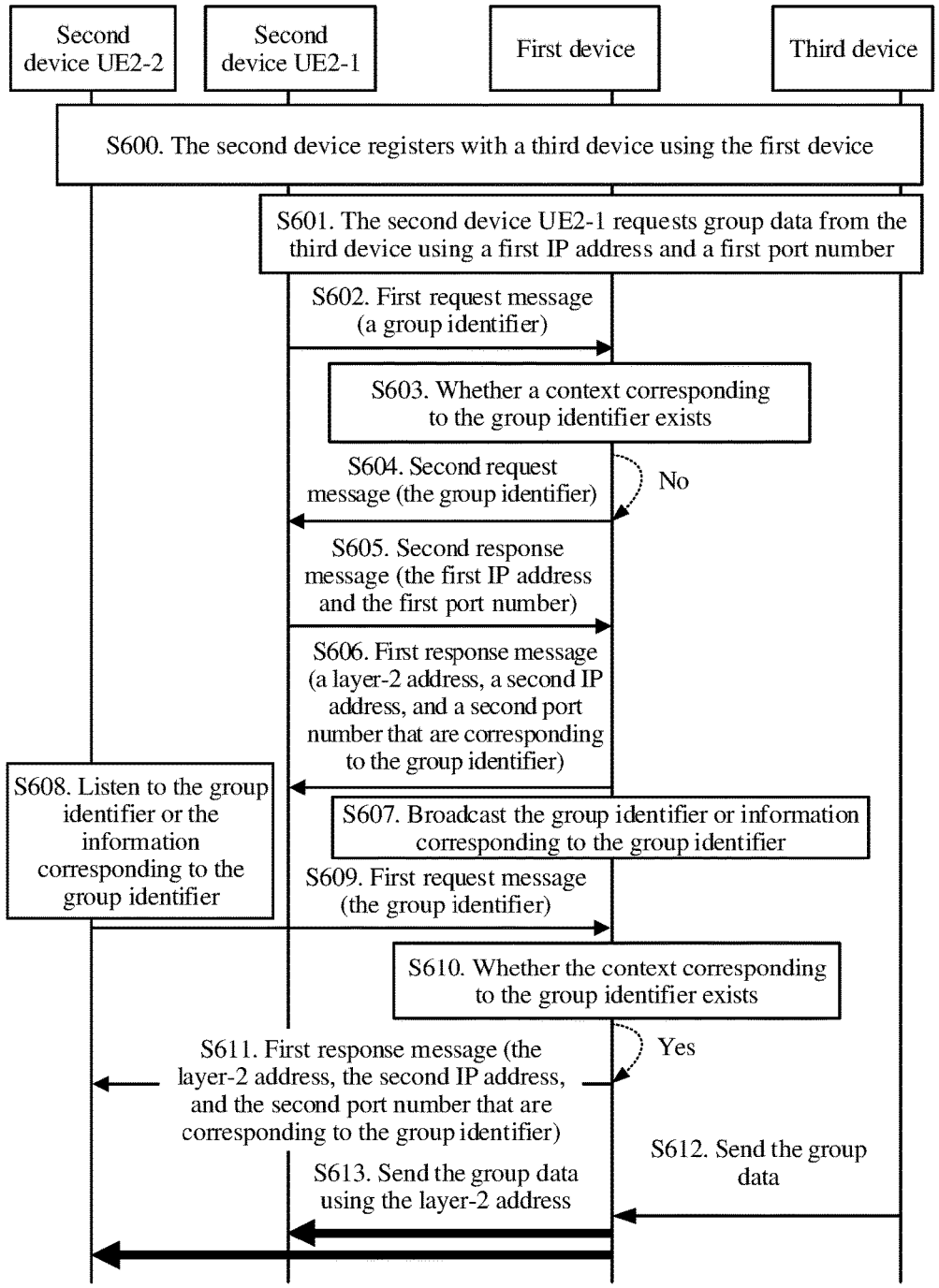
FIG. 6 is another schematic interaction diagram of a data communication method according to an embodiment of the present disclosure.

Referring to FIG. 6, FIG. 6 is another schematic interaction diagram of a data communication method according to an embodiment of the present disclosure. In this embodiment of the present disclosure, the data communication method may include the following steps.

In this embodiment of the present disclosure, a first device may receive a request message of one or more second devices, and request messages sent by the multiple second devices to the first device carry a same group identifier. For ease of description, in this embodiment of the present disclosure, when the group data is requested for the first time, a corresponding request terminal is referred to as a "second device UE2-1," and when the group data is not requested for the first time, a corresponding request terminal is referred to as a "second device UE2-2." It should be noted that the "second device UE2-1" and the "second device UE2-2" are merely used for description. In specific implementation, the "second device UE2-2" may refer to one or more second devices, and this is not limited in this embodiment of the present disclosure.

Step S600: The second device registers with a third device using the first device.

For specific technical details, refer to step S500 in the foregoing embodiment. Details are not repeatedly described herein. For ease of description, it is assumed that after the first device establishes a communication connection to the second device UE2-1, an IP address allocated by the first device to the second device UE2-1 is a "first IP address," and a port number used by the second device UE2-1 to receive group data that needs to be requested is a "first port number."

Step S601: The second device UE2-1 requests group data from the third device using a first IP address and a first port number.

In this embodiment of the present disclosure, when the second device UE2-1 needs to obtain group data from the third device, the group data has not been requested by another second device. For example, the second device UE2-1 fails to detect a group identifier corresponding to the group data or information corresponding to the group identifier by means of listening. That is, before the second device UE2-1 establishes a communication connection to the third device, the first device does not have a function of forwarding the group data, where the communication connection is used to receive the group data. Therefore, the second device UE2-1 establishes the communication connection to the third device using the first IP address and the first port number, where the communication connection is used to receive the group data, and second devices (including the second device UE2-1 and the second device UE2-2) may receive, from the third device using the communication connection, group data distributed in a unicast manner.

In this embodiment of the present disclosure, according to whether the first device supports an ALG-NAT function, the second device UE2-1 may establish the communication connection to the third device in two implementation manners.

In an implementation manner, if the first device supports the ALG-NAT, the second device UE2-1 performs media negotiation with the third device to establish an application layer session, sends, to the third device using an application layer message, an IP address and a port number that are used by the second device to transmit data, and receives an application layer message including an IP address and a port number that are of the third device and that are used by the third device to send data in order to establish the communication connection between the second device and the third device, where the communication connection is used to transmit unicast data. Further, when a SIP message is used, the second device UE2-1 uses the first IP address and the first port number as an IP address and a port number in a SDP message body in the SIP message, and sends the SIP message to the third device, to request the group data from the third device in order to establish the communication connection to the third device, where the communication connection is used to receive data distributed in a unicast manner. Therefore, the second device UE2-1 and the third device may mutually exchange, by means of negotiation, IP addresses and port numbers that are used to receive or send the group data.

In another implementation manner, if the first device does not support the ALG-NAT, the second device UE2-1 uses the first IP address and the first port number as a source IP address and a source port number of a data packet that is used to transmit application signaling, and sends the data packet to the third device, to request the group data from the third device in order to establish the communication connection that is used to transmit the group data. The application signaling indicates, to the third device, an IP address and a port number that are used by the second device to transmit unicast data. Therefore, the second device UE2-1 and the third device mutually exchange, by transmitting a data packet, IP addresses and port numbers that are used to receive or send the group data. In a specific implementation, the second device UE2-1 may transmit, using a same IP address and different port numbers, the group data and an application layer signaling message that are corresponding to the group identifier. Correspondingly, the second device UE2-1 may transmit, using a same IP address and a same port number, the group data and an application layer signaling message that are corresponding to the group identifier, where the transmission includes sending and/or receiving. The third device may transmit, using a same IP address and different port numbers, the group data and an application layer signaling message that are corresponding to the group identifier. Correspondingly, the third device may transmit, using a same IP address and a same port number, the group data and an application layer signaling message that are corresponding to the group identifier, where the transmission includes sending and/or receiving. This is not further limited in this embodiment of the present disclosure.

In a specific implementation, the second device (such as the UE2-1 or the UE2-2) needs to use the first device to communicate with a network side. For example, the second device obtains group data from the third device. Therefore, when the second device UE2-1 establishes the communication connection to the third device, the first device translates the first IP address and the first port number that are used by the second device UE2-1 to request the group data into a third IP address and a third port number that are used by the first device to receive the group data. The first IP address may be a private IP address, and the third IP address may be a public IP address. Subsequently, when receiving data whose destination IP address and destination port number are the third IP address and the third port number, the first device translates the destination address and the destination port number of the data into the first IP address and the first port number by means of NAT address translation, and then may send the data to the second device UE2-1.

For ease of description, regardless of whether the second device UE2-1 receives, using different port numbers, group data and an application layer signaling message that are sent by the third device, an IP address and a port number that are used by the second device UE2-1 to receive the group data are respectively referred to as the first IP address and the first port number in this embodiment of the present disclosure. Correspondingly, regardless of whether the third device sends the group data and the application layer signaling message using different port numbers, an IP address and a port number that are used by the third device to send the group data are respectively referred to as a fourth IP address and a fourth port number in this embodiment of the present disclosure. It should be noted that "first," "second," "third," and "fourth" in this embodiment of the present disclosure are merely used for description.

Step S602: The second device UE2-1 sends a first request message to the first device, where the first request message carries a group identifier.

In this embodiment of the present disclosure, after establishing the communication connection to the third device using the first device, the second device UE2-1 sends a request message to the first device, where the communication connection is used to receive the group data. For ease of subsequent description, the request message is referred to as the first request message in this embodiment of the present disclosure, the group identifier carried in the first request message is used to identify the group data in step S601, and the first request message is used to request the first device to forward the group data corresponding to the group identifier.

Step S603: The first device determines whether a context corresponding to the group identifier exists.

In a specific implementation, after the first device receives the first request message sent by the second device, the first device determines whether the context corresponding to the group identifier exists. For example, the first device determines whether information such as a layer-2 address and a second IP address that are corresponding to the group identifier exists. For specific technical details, refer to the foregoing embodiment, such as step S102. Details are not repeatedly described herein.

Step S604: If the context does not exist, the first device sends a second request message to the second device UE2-1, where the second request message carries the group identifier.

In this embodiment of the present disclosure, after the second device UE2-1 sends the request message, the first device may determine that the context corresponding to the group identifier carried in the request message does not exist. Therefore, the first device sends the second request message to the second device UE2-1, and adds the group identifier to the second request message such that the second device UE2-1 returns the first IP address and the first port number. The first IP address and the first port number are an IP address and a port number that are used when the second device UE2-1 requests the group data from the third device.

Step S605: The second device UE2-1 sends a second response message to the first device, where the second response message carries the first IP address and the first port number.

In a feasible implementation manner, if the second device transmits, using a same IP address and different port numbers, the group data and the application layer signaling message that are corresponding to the group identifier (for example, the second device receives, using an IP address XX1 and a port number YY1, the group data corresponding to the group identifier, and transmits, using the IP address XX1 and a port number ZZ1, the application layer signaling message corresponding to the group identifier, where the transmission includes sending and receiving, and this is not limited in this embodiment of the present disclosure), after receiving the second request message sent by the first device, the second device UE2-1 parses the group identifier carried in the second request message from the second request message, and obtains the first IP address and the first port number that are corresponding to the group identifier. The first IP address and the first port number are an IP address and a port number that are used when the second device UE2-1 requests the group data corresponding to the group identifier from the third device. The second device UE2-1 sends the second response message to the first device, where the second response message carries the first IP address and the first port number. Therefore, when subsequently receiving a data packet obtained after address translation, the first device can send the data packet to one or more second devices, where a destination address of the data packet is the first IP address and a destination port number of the data packet is the first port number.

In another feasible implementation manner, if the third device transmits, using a same IP address and different port numbers, the group data and the application layer signaling message that are corresponding to the group identifier (for example, the third device sends, using an IP address XX3 and a port number YY3, the group data corresponding to the group identifier, and transmits, using the IP address XX3 and a port number ZZ3, the application layer signaling message corresponding to the group identifier, where the transmission includes sending and receiving, and this is not limited in this embodiment of the present disclosure), after receiving the second request message sent by the first device, the second device UE2-1 parses the group identifier carried in the second request message from the second request message, and obtains the first IP address, the first port number, the fourth IP address, and the fourth port number that are corresponding to the group identifier. The first IP address and the first port number are an IP address and a port number that are used when the second device UE2-1 requests the group data corresponding to the group identifier from the third device. The fourth IP address and the fourth port number are an IP address and a port number that are used by the third device to send the group data to the second device. The second device UE2-1 sends the second response message to the first device, where the second response message carries the first IP address, the first port number, the fourth IP address, and the fourth port number. Therefore, when subsequently receiving a data packet obtained after address translation, the first device can send the data packet to one or more second devices, where a source address of the data packet is the fourth IP address, a source port number of the data packet is the fourth port number, a destination address of the data packet is the first IP address, and a destination port number of the data packet is the first port number.

Step S606: The first device sends a first response message to the second device UE2-1, where the first response message carries a layer-2 address, a second IP address, and a second port number that are corresponding to the group identifier.

After receiving the second response message sent by the second device UE2-1, the first device allocates, according to the group identifier, the layer-2 address, the second IP address, and the second port number that are corresponding to the group identifier. In this embodiment, that the first device allocates information such as a layer-2 address, an IP address, and a port number may include, after receiving the second response message of the second device UE2-1, the first device allocates information such as the layer-2 address, the second IP address, and the second port number, or the first device preconfigures some pieces of information such as a layer-2 address, an IP address, and a port number, and after receiving the second response message of the second device UE2-1, selects a group of information such as a layer-2 address, an IP address, and a port number from the preconfigured information as the layer-2 address, the second IP address, and the second port number that are corresponding to the group identifier. In this embodiment of the present disclosure, subsequently, the first device uses the layer-2 address to send, to all second devices that request the first device to forward the group data, the received data that is sent to the second device UE2-1 such that the second device UE2-1 listens to and receives the group data at the layer-2 address. In specific implementation, the second device may set a default port number that is used to receive the group data, and therefore, the second port number in the first response message is optional. After receiving the group data sent by the third device, the first device routes the group data to the second IP address and the second port number. The second IP address and the second port number are a destination IP address and a destination port number that are used when the first device sends the group data. In specific implementation, the second IP address may be an IP multicast address, and the second IP address and the second port number are a destination IP address and a destination port number that are allocated by the first device and that are used to indicate the group data.

It should be noted that, the first response message sent by the first device to the second device UE2-1 may further carry a unicast indication identifier such that after receiving the first response message returned by the first device, the second device UE2-1 keeps the communication connection established in step S601. Therefore, the second device UE2-1 keeps the communication connection for receiving, from the third device, the group data distributed in a unicast manner.

In this embodiment of the present disclosure, in order to make the first device send, to all second devices that send first request messages to the first device, the group data that is sent to the second device UE2-1, and make the second device receive the group data using the second IP address and the second port number, when the first device receives the group data that is sent by the third device to the second device UE2-1, the first device is supposed to modify an NAT table or a routing table after this step. Details are as follows.

When the second device UE2-1 transmits, using a same IP address and different port numbers, the application layer signaling and the data that are corresponding to the group identifier, the first device translates, using an NAT function, the first IP address and the first port number that are used by the second device UE2-1 to request the group data into the third IP address and the third port number that are used by the first device to receive the group data. Therefore, when receiving data sent to the third IP address and the third port number, the first device translates a destination IP address and a destination port number of the data into the first IP address and the first port number by means of NAT address translation, and modifies the routing table according to the second response message returned by the second device UE2-1 to modify the destination address and the destination port number of the data, obtained after address translation, whose destination address and destination port number are the first IP address and the first port number into the second IP address and the second port number. If the second response message does not include a port number, a port number of the data does not change, that is, the port number of the data is still the first port number such that the data is routed to the second IP address and the second port number or the second IP address and the first port number. Optionally, the first device may modify the NAT table to implement the foregoing objective of directly translating an address and a port number that are of data sent to the third IP address and the third port number into the second IP address and the second port number for forwarding. If the first response message does not include a port number, a port number of the data does not change, that is, the address and the port number of the data are translated into the second IP address and the first port number.

When the third device transmits, using a same IP address and different port numbers, the application layer signaling and the data that are corresponding to the group identifier, similarly, the first device translates, using the NAT function, the first IP address and the first port number that are used by the second device UE2-1 to request the group data into the third IP address and the third port number that are used by the first device to receive the group data. Therefore, when receiving data sent to the third IP address and the third port number, the first device translates a destination IP address and a destination port number of the data into the first IP address and the first port number by means of NAT address translation, and modifies the routing table according to the second response message returned by the second device UE2-1 to modify the destination address and the destination port number that are of the data, obtained after address translation, whose destination address and destination port number are the first IP address and the first port number and whose source address and source port number are the fourth IP address and the fourth port number into the second IP address and the second port number. If the first response message does not include a port number, a port number of the data does not change, that is, the port number of the data is still the first port number such that the data is routed to the second IP address and a second port again, or routed to the second IP address and a first port again.

Step S607: The first device broadcasts the group identifier or information corresponding to the group identifier.

In this embodiment of the present disclosure, after the first device returns the first response message to the second device UE2-1, it indicates that the first device can forward the group data requested by the second device, and therefore, the first device may broadcast the group identifier or the information corresponding to the group identifier. Subsequently, when another second device (for example, the UE2-2) needs to request the group data corresponding to the group identifier from the first device, if the other second device has detected the group identifier or the information corresponding to the group identifier by means of listening, it indicates that the first device can forward the group data. Therefore, the second device that subsequently requests the group data may directly send a first request message to the first device to receive the group data, without establishing a communication connection to the third device, where the communication connection is used to receive the group data. In an optional embodiment, the first response message may further carry an update timer corresponding to the group identifier, and each newly specified update timer has preset duration. Therefore, the update timer may be used to indicate remaining duration for broadcasting the group identifier. When the remaining duration corresponding to the update timer is 0, if the second device still expects to continue to listen to the group data, the second device needs to send another request message to the first device, and the first device performs step S601, or if the second device does not expect to continue to listen to the group data, the first device stops forwarding the group data and deletes information such as the context in the request. Therefore, power consumption of a terminal can be effectively reduced, and a service life of the terminal can be extended.

Step S608: The second device listens to the group identifier or the information corresponding to the group identifier.

In a specific implementation, after the first device broadcasts the group identifier or the information corresponding to the group identifier, the second device may detect the group identifier or the information corresponding to the group identifier by means of listening in order to learn that the first device may currently forward the group data corresponding to the group identifier and that is sent by the third device. Therefore, if the second device UE2-2 also needs to receive the group data, the second device UE2-2 may send a first request message to the first device, and adds the group identifier to the first request message.

Step S609: The second device UE2-2 sends a first request message to the first device, where the first request message carries the group identifier.

In this embodiment of the present disclosure, when the second device UE2-2 needs to request the group data, the second device UE2-2 has detected, by means of listening, the group identifier broadcasted by the first device or the information corresponding to the group identifier and that is broadcasted by the first device. Therefore, before sending the first request message to the first device, the second device UE2-2 does not need to establish a communication connection to the third device, where the communication connection is used to receive the group data. It should be noted that the first request messages sent by the second device UE2-2 and the second device UE2-1 carry the same group identifier. For specific technical details, refer to step S602. Details are not repeatedly described herein.

Step S610: The first device determines whether the context corresponding to the group identifier exists.

In a specific implementation, after the first device receives the first request message sent by the second device, the first device determines whether the context corresponding to the group identifier exists. For example, the first device determines whether information such as the layer-2 address and the second IP address that are corresponding to the group identifier exists. For specific technical details, refer to the foregoing embodiment, such as step S102. Details are not repeatedly described herein.

Step S611: The first device sends a first response message to the second device UE2-2, where the first response message carries the layer-2 address, the second IP address, and the second port number that are corresponding to the group identifier.

In this embodiment of the present disclosure, before the second device UE2-2 sends the first request message to the first device, the second device UE2-1 has already sent the first request message to the first device, and the first device has allocated information such as the layer-2 address and the second IP address that are corresponding to the group identifier in the first request message. Therefore, after receiving the first request message sent by the second device UE2-2, the first device may determine that the context corresponding to the group identifier exists.

In this embodiment of the present disclosure, after the first device receives the first request message sent by the second device, if the first device determines that the context corresponding to the group identifier carried in the first request message exists, the first device directly obtains the layer-2 address, the second IP address, and the second port number that are corresponding to the group identifier, and returns the first response message to the second device, where the first response message carries the obtained layer-2 address, the obtained second IP address, and the obtained second port number. It should be noted that, similar to step S606, the second port number is optional in this specific implementation.

Step S612: The first device receives the group data that is sent by the third device to the second device UE2-1.

In a specific implementation, when the first device receives data, obtained after address translation, whose destination IP address and destination port number are respectively the first IP address and the first port number, or when the first device receives data, obtained after address translation, whose destination IP address and destination port number are respectively the first IP address and the first port number and whose source IP address and source port number are respectively the fourth IP address and the fourth port number, the first device routes the data packet to the second IP address and the second port number after the first device returns the first response message in step S606. If the first response message does not include the second port number, only a destination IP address for receiving the data is modified into the second IP address.

Step S613: The first device sends the group data using the layer-2 address.

In this embodiment of the present disclosure, both the second device UE2-1 and the second device UE2-2 request to obtain the group data from the first device, where the second device UE2-2 may be one or more second devices. This is not further limited in this embodiment of the present disclosure.

When receiving the group data that is sent by the third device to the second device UE2-1, the first device sends the group data to the second IP address and the second port number, and sends the group data at a data link layer using the layer-2 address. Therefore, one or more second devices that have received the first response message from the first device may listen to and receive the group data at the layer-2 address, and the first device implements relay from unicast data to multicast data.

According to the data communication method described in this embodiment of the present disclosure, a first device receives a first request message sent by at least one second device, and the first request message is used to request the first device to forward group data, and the request message carries a group identifier. The first device returns a first response message to the at least one second device, and the first response message carries a layer-2 address and an IP address that are corresponding to the group identifier. When receiving the group data that is sent by a third device to one of the at least one second device, the first device sends the group data using the layer-2 address. According to this embodiment of the present disclosure, the first device sends, to one or more second devices that request the group data from the first device, the group data that is sent by the third device to one of the at least one second device, thereby improving data transmission efficiency.

It should be noted that, a sequence of establishing the communication connection to the third device by the second device UE2-1 is not limited in this embodiment, where the communication connection is used to receive the group data. That is, the second device UE2-1 may establish the communication connection to the third device before sending the first request message, where the communication connection is used to transmit the group data, and when receiving the second request message sent by the first device, the second device UE2-1 returns the second response message according to the established communication connection, or the second device UE2-1 may establish the communication connection to the third device after receiving the second request message, where the communication connection is used to transmit the group data, and the second device UE2-1 returns the second response message after completing establishment of the communication connection. This is not limited in this embodiment of the present disclosure.

The following shows apparatus embodiments of the present disclosure. The apparatus embodiments of the present disclosure and method embodiments of the present disclosure belong to a same concept, and apparatuses described in the apparatus embodiments of the present disclosure are configured to execute methods described in the method embodiments of the present disclosure. For ease of description, the apparatus embodiments of the present disclosure merely show related parts of the apparatus embodiments of the present disclosure. For specific technical details that are not disclosed, refer to descriptions in the method embodiments of the present disclosure. Details are not repeatedly described herein.

Figure 7:
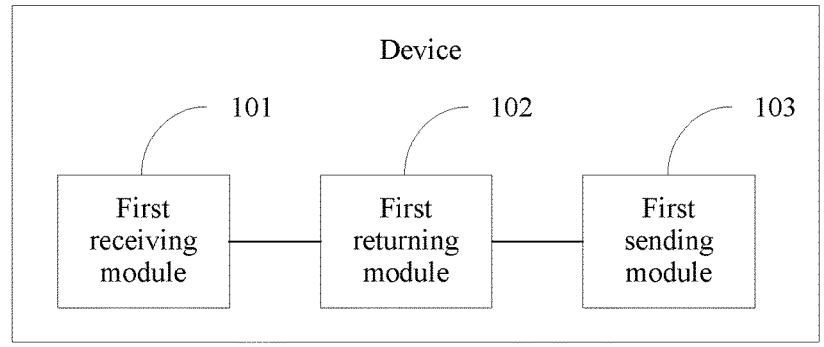
FIG. 7 is a schematic structural diagram of a device according to an embodiment of the present disclosure.
Figure 8:
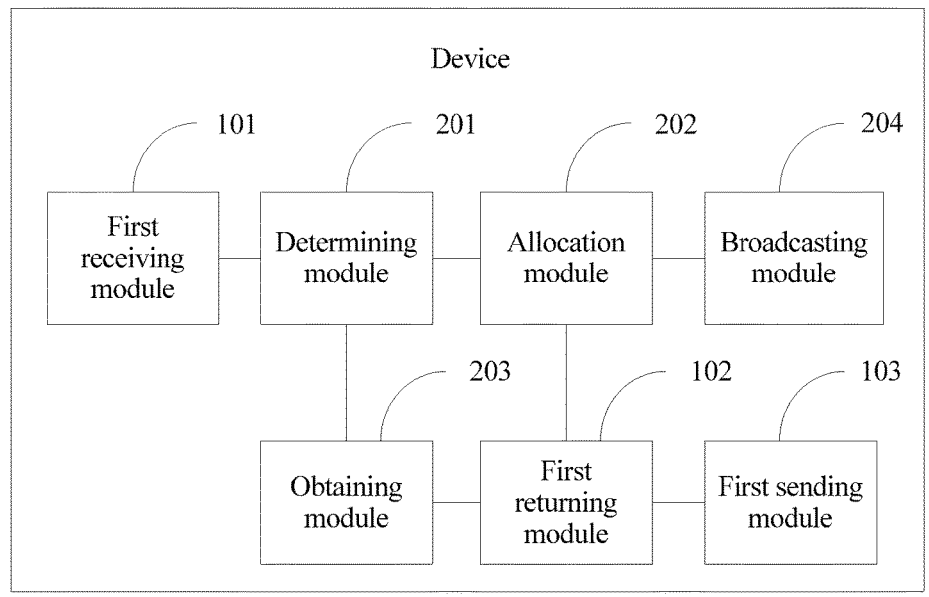
FIG. 8 is another schematic structural diagram of a device according to an embodiment of the present disclosure.
Figure 9:
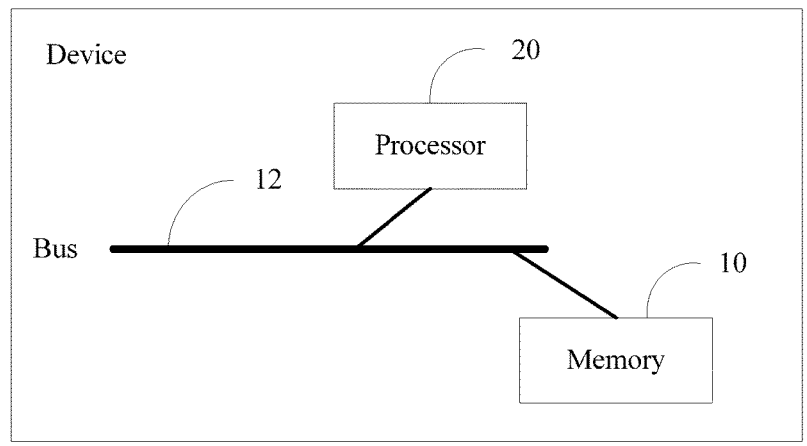
FIG. 9 is still another schematic structural diagram of a device according to an embodiment of the present disclosure.
Figure 10:
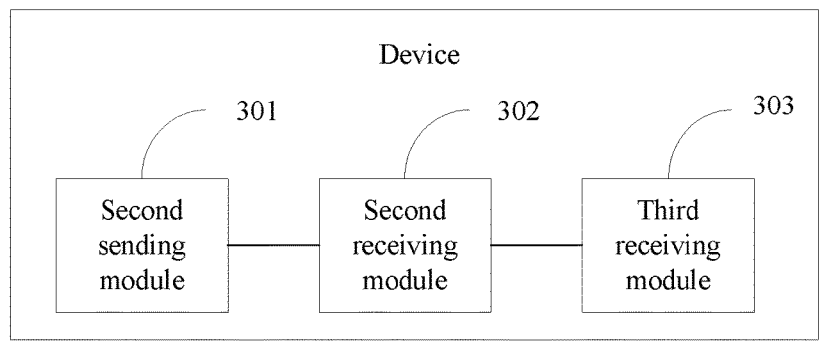
FIG. 10 is yet another schematic structural diagram of a device according to an embodiment of the present disclosure.
Figure 11:
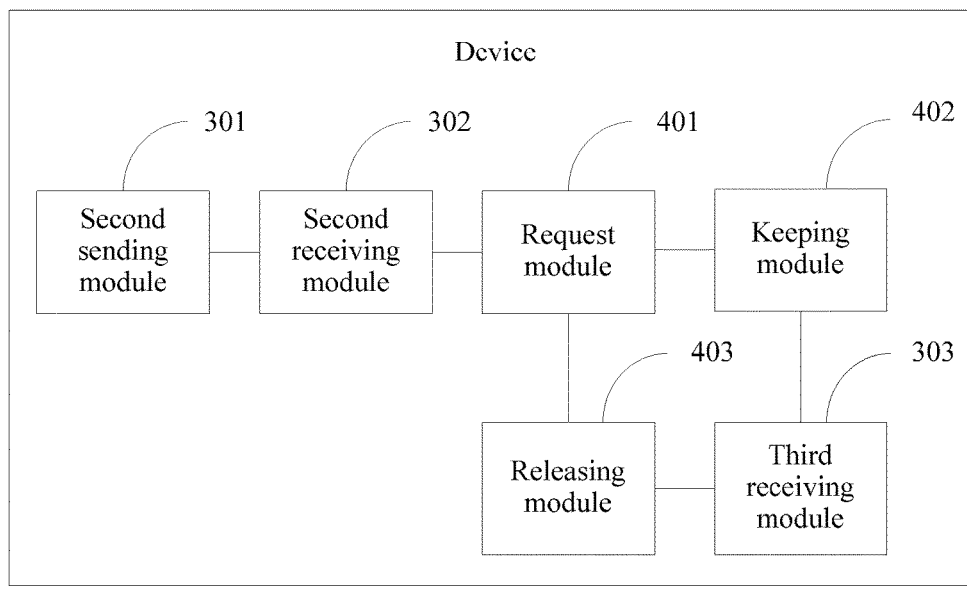
FIG. 11 is still yet another schematic structural diagram of a device according to an embodiment of the present disclosure.
Figure 12:
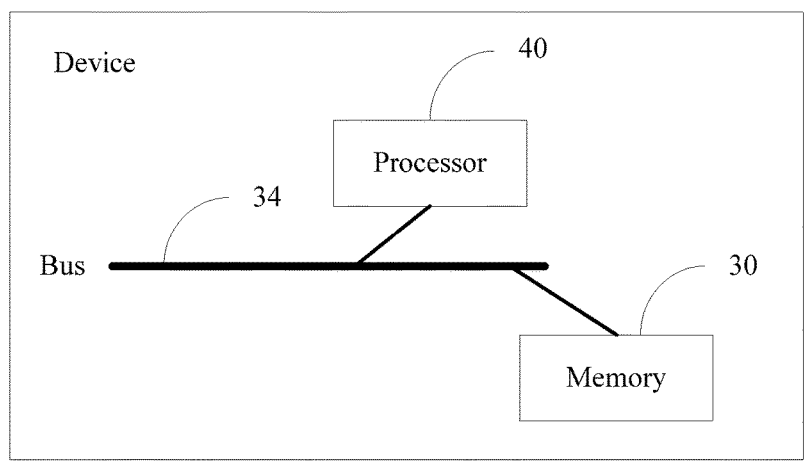
FIG. 12 is a further schematic structural diagram of a device according to an embodiment of the present disclosure.

For ease of understanding, it should be noted that, devices mentioned in embodiments shown in FIG. 7, FIG. 8, and FIG. 9 are corresponding to the first device in the foregoing embodiment, and for specific technical details, refer to method embodiments shown in FIG. 1B, FIG. 2A and FIG. 2B. Devices mentioned in embodiments shown in FIG. 10, FIG. 11, and FIG. 12 are corresponding to the second device in the foregoing embodiment, and for specific technical details, refer to method embodiments shown in FIG. 3, FIG. 4A, and FIG. 4B. Details are not repeatedly described herein.

Referring to FIG. 7, FIG. 7 is a schematic structural diagram of a device according to an embodiment of the present disclosure. In this embodiment of the present disclosure, the device may include a first receiving module 101, a first returning module 102, and a first sending module 103.

The first receiving module 101 is configured to receive a request message sent by at least one second device, where the request message is used to request the device to forward group data, and the request message carries a group identifier.

The first returning module 102 is configured to return a response message to the at least one second device, where the response message carries a layer-2 address and an IP address that are corresponding to the group identifier.

The first sending module 103 is configured to send the group data using the layer-2 address when the group data that is sent by a third device to the IP address is received.

According to the device described in this embodiment of the present disclosure, a first device receives a request message sent by at least one second device, and the request message is used to request the first device to forward group data, and the request message carries a group identifier. The first device returns a response message to the at least one second device, and the response message carries a layer-2 address and an IP address that are corresponding to the group identifier. When receiving the group data that is sent by a third device to the IP address, the first device sends the group data using the layer-2 address. According to this embodiment of the present disclosure, the first device sends the group data using the layer-2 address such that one or more second devices that have requested the group data from the first device can receive the group data at the layer-2 address, thereby improving data transmission efficiency.

Referring to FIG. 8, FIG. 8 is another schematic structural diagram of a device according to an embodiment of the present disclosure. In this embodiment of the present disclosure, in addition to the first receiving module 101, the first returning module 102, and the first sending module 103 that are described in the foregoing embodiment, the device may include a determining module 201, an allocation module 202, an obtaining module 203, and a broadcasting module 204.

In an optional implementation manner, the IP address is an IP address that is allocated by the device and that is used by the at least one second device to request the group data from the third device.

In another optional implementation manner, the response message further carries a port number corresponding to the group identifier, and the port number is a port number that is allocated by the first device and that is used by the at least one second device to request the group data from the third device.

In another optional implementation manner, the device may further include the determining module 201 and the allocation module 202. The determining module 201 is configured to determine whether a context corresponding to the group identifier exists after the first receiving module 101 receives the request message sent by the at least one second device. The allocation module 202 is configured to allocate the layer-2 address and the IP address that are corresponding to the group identifier if the context does not exist, where the response message returned by the first returning module 102 carries the layer-2 address and the IP address that are allocated by the allocation module 202.

In another optional implementation manner, the device may further include the obtaining module 203. The obtaining module 203 is configured to obtain the layer-2 address and the IP address that are corresponding to the group identifier if the context exists, where the response message returned by the first returning module 102 carries the layer-2 address and the IP address that are obtained by the obtaining module 203.

In another optional implementation manner, if the context does not exist, the response message returned by the first returning module 102 further carries a unicast indication identifier such that the at least one second device requests the group data from the third device using the IP address.

In another optional implementation manner, the first receiving module 101 is further configured to receive a first message sent by a target second device after the first returning module 102 returns the response message to the at least one second device, where the target second device is a second device that is in the at least one second device and that fails to detect the group identifier or information corresponding to the group identifier by means of listening, and the first message is a message sent after the target second device successfully requests the group data from the third device. The determining module 201 may be further configured to determine whether the first message is received for the first time. The first returning module 102 is further configured to return a second message to the target second device such that any second device keeps a communication connection to the third device if the first device receives the first message for the first time, where the communication connection is used to receive the group data.

In another optional implementation manner, the first returning module 102 is further configured to return a third message to the target second device such that the target second device releases the communication connection to the third device if the first device does not receive the first message for the first time, where the communication connection is used to receive the group data.

In another optional implementation manner, the device may further include the broadcasting module 204. The broadcasting module 204 is configured to broadcast the group identifier or the information corresponding to the group identifier after the first returning module 102 returns the second message to the target second device.

According to the device described in this embodiment of the present disclosure, a first device receives a request message sent by at least one second device, and the request message is used to request the first device to forward group data, and the request message carries a group identifier. The first device returns a response message to the at least one second device, and the response message carries a layer-2 address and an IP address that are corresponding to the group identifier. The first device sends the group data using the layer-2 address when receiving the group data that is sent by a third device to the IP address. According to this embodiment of the present disclosure, the first device sends the group data using the layer-2 address such that one or more second devices that have requested the group data from the first device can receive the group data at the layer-2 address, thereby improving data transmission efficiency.

Referring to FIG. 9, FIG. 9 is still another schematic structural diagram of a device according to an embodiment of the present disclosure. In this embodiment of the present disclosure, the device includes a memory 10 and a processor 20, and the memory 10 and the processor 20 are connected using a bus 12.

In this embodiment of the present disclosure, the memory 10 stores an instruction for implementing a data communication method by a first device, and the processor 20 invokes and executes the instruction in the memory 10 in order to implement the data communication method processed by the first device. In this embodiment of the present disclosure, for a technical principle and a technical effect of the device, refer to descriptions related to the first device in embodiments shown in FIG. 1B, FIG. 2A FIG. 2B, FIG. 7, and FIG. 8. Details are not repeatedly described herein.

Referring to FIG. 10, FIG. 10 is yet another schematic structural diagram of a device according to an embodiment of the present disclosure. In this embodiment of the present disclosure, the device may include a second sending module 301, a second receiving module 302, and a third receiving module 303.

The second sending module 301 is configured to send a request message to a first device, where the request message is used to request the first device to forward group data, and the request message carries a group identifier.

The second receiving module 302 is configured to receive a response message returned by the first device, where the response message carries a layer-2 address and an IP address that are corresponding to the group identifier, and the first device receives a request message sent by at least one device, and when receiving the group data that is sent by a third device to the IP address, sends the group data using the layer-2 address.

The third receiving module 303 is configured to receive the group data at the layer-2 address.

According to the device described in this embodiment of the present disclosure, a second device sends a request message to a first device, where the request message carries a group identifier. The second device receives a response message returned by the first device, where the response message carries a layer-2 address and an IP address that are corresponding to the group identifier, and when receiving the group data that is sent by a third device to the IP address, the first device sends the group data using the layer-2 address, and the second device receives the group data at the layer-2 address. According to this embodiment of the present disclosure, the first device forwards, using the layer-2 address, the group data that is sent by the third device to the IP address such that one or more second devices that have requested the group data from the first device can receive the group data at the layer-2 address, thereby improving data transmission efficiency.

Referring to FIG. 11, FIG. 11 is still yet another schematic structural diagram of a device according to an embodiment of the present disclosure. In this embodiment of the present disclosure, in addition to the second sending module 301, the second receiving module 302, and the third receiving module 303 that are described in the foregoing embodiment, the device may include a request module 401, a keeping module 402, and a releasing module 403.

In an optional implementation manner, the response message further carries a port number corresponding to the group identifier, and the IP address and the port number are an IP address and a port number that are allocated by the first device and that are used by the device to request the group data.

In another optional implementation manner, the device may further include the request module 401. The request module 401 is configured to request the group data from the third device using the IP address, or request the group data from the third device using the IP address and the port number after the second receiving module 302 receives the response message returned by the first device.

In another optional implementation manner, if the device fails to detect the group identifier or information corresponding to the group identifier by means of listening, the request module 401 requests the group data from the third device, or if the response message further carries a unicast indication identifier, the request module 401 requests the group data from the third device.

In another optional implementation manner, the second sending module 301 is further configured to send a first message to the first device after the request module 401 successfully requests the group data from the third device. The keeping module 402 is configured to keep a communication connection to the third device if a second message returned by the first device is received, where the communication connection is used to receive the group data. The releasing module 403 is configured to release the communication connection to the third device if a third message returned by the first device is received, where the communication connection is used to receive the group data.

In another optional implementation manner, the request module 401 is further configured to set the IP address and/or the port number as a source IP address and/or a source port number of a data packet that is used to transmit application signaling, and send the data packet to the third device, to request the group data from the third device, or set the IP address and/or the port number as an IP address and/or a port number in an SDP message body in a SIP message, and send the SIP message to the third device, to request the group data from the third device.

According to the device described in this embodiment of the present disclosure, a second device sends a request message to a first device, where the request message carries a group identifier. The second device receives a response message returned by the first device, where the response message carries a layer-2 address and an IP address that are corresponding to the group identifier, and when receiving the group data that is sent by a third device to the IP address, the first device sends the group data using the layer-2 address, and the second device receives the group data at the layer-2 address. According to this embodiment of the present disclosure, the first device forwards, using the layer-2 address, the group data that is sent by the third device to the IP address such that one or more second devices that have requested the group data from the first device can receive the group data at the layer-2 address, thereby improving data transmission efficiency.

Referring to FIG. 12, FIG. 12 is a further schematic structural diagram of a device according to an embodiment of the present disclosure. In this embodiment of the present disclosure, the device includes a memory 30 and a processor 40, and the memory 30 and the processor 40 are connected using a bus 34.

In this embodiment of the present disclosure, the memory 30 stores an instruction for implementing a data communication method by a second device, and the processor 40 invokes and executes the instruction in the memory 30 in order to implement the data communication method processed by the second device. In this embodiment of the present disclosure, for a technical principle and a technical effect of the device, refer to descriptions related to the second device in embodiments shown in FIG. 3, FIG. 4A, FIG. 4B, FIG. 10, and FIG. 11. Details are not repeatedly described herein.

It should be noted that, for brief description, the foregoing method embodiments are represented as a series of actions. However, a person skilled in the art should appreciate that the present disclosure is not limited to the described sequence of the actions, because according to the present disclosure, some steps may be performed in other sequences or simultaneously. In addition, a person skilled in the art should also appreciate that all the embodiments described in the specification are embodiments, and the related actions and modules are not necessarily mandatory to the present disclosure.

In the foregoing embodiments, the description of each embodiment has respective focuses. For a part that is not described in detail in an embodiment, refer to related descriptions in other embodiments. In addition, the terms "first," "second," "third," and "fourth" are merely used for description, and shall not be understood as an indication or implication of relative importance or implicit indication of the number of indicated technical features.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The data communication method and device provided in the embodiments of the present disclosure are described in detail above. Principles and implementation manners of the present disclosure are described herein through specific examples. The description of the foregoing embodiments is merely provided to help understand the method and core ideas of the present disclosure. In addition, a person of ordinary skill in the art can make variations and modifications to the present disclosure in terms of the specific implementation manners and application scopes according to the ideas of the present disclosure. Therefore, the content of specification shall not be construed as a limit to the present disclosure.

What is claimed is:

1. A data communication method, comprising:
   receiving, by a first device, a request message from a second device, the request message requesting the first device to forward group data, and the request message carrying a group identifier;
   sending, by the first device, a response message to the second device, the response message carrying a layer-2 address corresponding to the group identifier;
   sending, by the first device, the group data using the layer-2 address when receiving the group data from a third device; and
   broadcasting, by the first device, information corresponding to the group identifier after returning the response message to the second device.

2. The data communication method of claim 1, wherein the information corresponding to the group identifier comprises the layer-2 address.

3. The data communication method of claim 1, wherein after receiving the request message, the method further comprises:
   determining, by the first device, whether a context corresponding to the group identifier exists; and
   allocating, by the first device, the layer-2 address corresponding to the group identifier when the context does not exist, and the response message returned to the second device carries the layer-2 address.

4. A first device, comprising:
   a memory configured to store an instruction;
   a processor coupled to the memory and configured to invoke and execute the instruction stored in the memory; and
   a transceiver coupled to the processor and configured to:
      receive a request message from a second device, the request message requesting the first device to forward group data, and the request message carrying a group identifier;
      send a response message to the second device, the response message carrying a layer-2 address corresponding to the group identifier;
      send the group data using the layer-2 address when receiving the group data from a third device; and
      broadcast information corresponding to the group identifier after sending the response message to the second device.

5. The first device of claim 4, wherein the information corresponding to the group identifier comprises the layer-2 address.

6. The first device of claim 4, wherein the processor is further configured to:

determine whether a context corresponding to the group identifier exists; and allocate the layer-2 address corresponding to the group identifier when the context does not exist.

7. The first device of claim 6, wherein the processor is further configured to obtain the layer-2 address corresponding to the group identifier when the context exists.

8. A non-transitory computer-readable medium having computer usable instructions stored thereon for execution by a processor, the computer usable instructions, when executed, causing the processor to:

receive a request message from a second device, the request message requesting a first device to forward group data, and the request message carrying a group identifier;

send a response message to the second device, the response message carrying a layer-2 address corresponding to the group identifier;

send the group data using the layer-2 address when receiving the group data from a third device; and broadcast information corresponding to the group identifier after sending the response message to the second device.

9. The non-transitory computer-readable medium of claim 8, wherein the information corresponds to the group identifier comprises the layer-2 address.

10. The non-transitory computer-readable medium of claim 8, wherein the computer usable instructions, when executed, further cause the processor to:

determine whether a context corresponding to the group identifier exists; and allocate the layer-2 address corresponding to the group identifier when the context does not exist.

11. The non-transitory computer-readable medium of claim 10, wherein the computer usable instructions, when executed, further cause the processor to obtain the layer-2 address corresponding to the group identifier when the context exists.

* * * * *